INVENTORS
MELVIN L. DOELZ
FRANK SECRETAN
BY
Moody and Phillion
ATTORNEYS

| ADDRESS | 109 | 110 | 111 | 112 | 113 | X | Y | R |
|---|---|---|---|---|---|---|---|---|
| 1001 | 1 | 0 | 0 | 0 | 0 | 1.0 | 0.0 | 1.0+j0.0 |
| 1002 | 0 | 1 | 0 | 0 | 0 | 0.9 | 0.4 | 0.9+j0.4 |
| 1003 | 1 | 1 | 0 | 0 | 0 | 0.7 | 0.7 | 0.7+j0.7 |
| 1004 | 0 | 0 | 1 | 0 | 0 | 0.4 | 0.9 | 0.4+j0.9 |
| 1005 | 1 | 0 | 1 | 1 | 0 | 0.0 | 1.0 | -00+j1.0 |
| 1006 | 0 | 0 | 1 | 1 | 0 | 0.4 | 0.9 | -04+j0.9 |
| 1007 | 1 | 1 | 0 | 1 | 0 | 0.7 | 0.7 | -0.7+j0.7 |
| 1008 | 0 | 1 | 0 | 1 | 0 | 0.9 | 0.4 | -0.9+j0.4 |
| 1009 | 1 | 0 | 0 | 1 | 1 | 1.0 | 0.0 | -1.0-j0.0 |
| 1010 | 0 | 1 | 0 | 1 | 1 | 0.9 | 0.4 | -0.9-j0.4 |
| 1011 | 1 | 1 | 0 | 1 | 1 | 0.7 | 0.7 | -0.7-j0.7 |
| 1012 | 0 | 0 | 1 | 1 | 1 | 0.4 | 0.9 | -0.4-j0.9 |
| 1013 | 1 | 0 | 1 | 0 | 1 | 0.0 | 1.0 | 0.0-j1.0 |
| 1014 | 0 | 0 | 1 | 0 | 1 | 0.4 | 0.9 | 0.4-j0.9 |
| 1015 | 1 | 1 | 0 | 0 | 1 | 0.7 | 0.7 | 0.7-j0.7 |
| 1016 | 0 | 1 | 0 | 0 | 1 | 0.9 | 0.4 | 0.9-j0.4 |
FIG 4
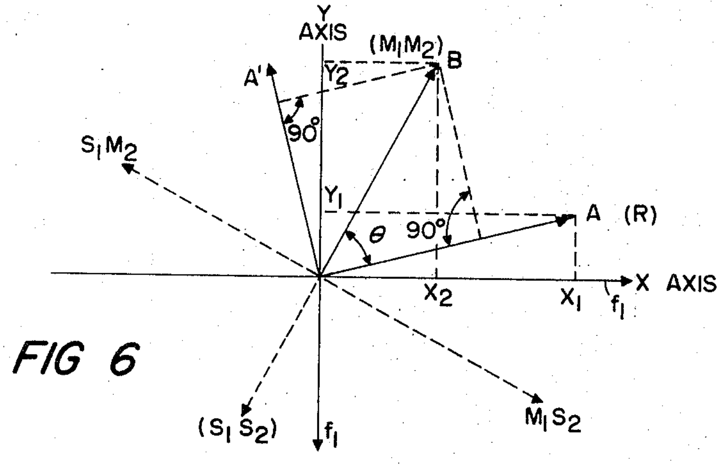
FIG 6
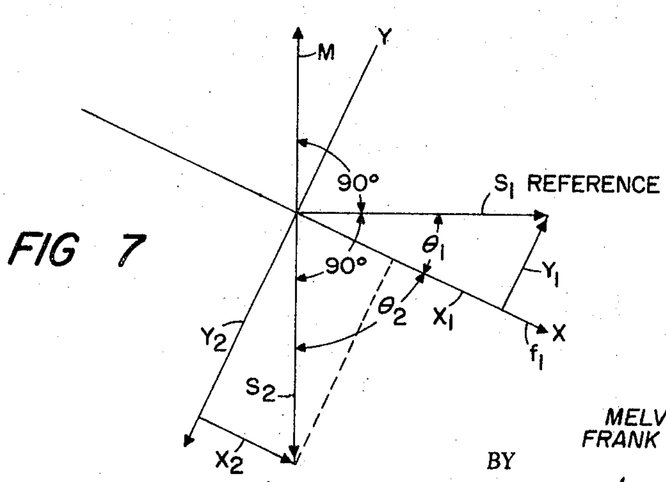
FIG 7
INVENTORS
MELVIN L. DOELZ
FRANK SECRETAN
BY
Moody and Phillips
ATTORNEYS INVENTORS
MELVIN L. DOELZ
FRANK SECRETAN
BY
Moody and Phillips
ATTORNEYS INVENTORS
MELVIN L. DOELZ
FRANK SECRETAN
BY
Moody and Phillion
ATTORNEYS INVENTORS
MELVIN L. DOELZ
FRANK SECRETAN
BY Moody and Phillion
ATTORNEYS Sept. 12, 1967 M. L. DOELZ ET AL 3,341,776

ERROR SENSITIVE BINARY TRANSMISSION SYSTEM WHEREIN FOUR CHANNELS ARE TRANSMITTED VIA ONE CARRIER WAVE

Filed Jan. 13, 1964 10 Sheets-Sheet 6

INVENTORS
MELVIN L. DOELZ
FRANK SECRETAN

BY Moody and Phillips

ATTORNEYS

INVENTORS
MELVIN L. DOELZ
FRANK SECRETAN
BY
Moody and Phillion
ATTORNEYS

Sept. 12, 1967 M. L. DOELZ ET AL 3,341,776

ERROR SENSITIVE BINARY TRANSMISSION SYSTEM WHEREIN FOUR CHANNELS ARE TRANSMITTED VIA ONE CARRIER WAVE

Filed Jan. 13, 1964 10 Sheets-Sheet 8

INVENTORS
MELVIN L. DOELZ
FRANK SECRETAN
BY
Moody and Phillion
ATTORNEYS

| SIGNAL CODE | ADDRESS | CONSTANT K |
|---|---|---|
| 111 | 7 | 1 |
| 110 | 6 | 3 |
| 010 | 2 | 5 |
| 011 | 3 | 7 |
| 001 | 1 | 9 |
| 000 | 0 | 11 |
| 100 | 4 | 13 |
| 101 | 5 | 15 |

| SIGNAL CODE | ADDRESS | CONSTANT K |
|---|---|---|
| 11 | 3 | 2 |
| 01 | 1 | 6 |
| 00 | 0 | 10 |
| 10 | 2 | 14 |

| SIGNAL CODE | ADDRESS | CONSTANT K |
|---|---|---|
| 1 | 1 | 4 |
| 0 | 0 | 12 |

INVENTORS
MELVIN L. DOELZ
FRANK SECRETAN
BY Moody and Phillion
ATTORNEYS

INVENTORS
MELVIN L. DOELZ
FRANK SECRETAN
BY Moody and Phillion
ATTORNEYS

United States Patent Office 3,341,776

Patented Sept. 12, 1967

3,341,776

ERROR SENSITIVE BINARY TRANSMISSION SYSTEM WHEREIN FOUR CHANNELS ARE TRANSMITTED VIA ONE CARRIER WAVE

Melvin L. Doelz, Corona Del Mar, and Frank Secretan, Santa Ana, Calif., assignors to Collins Radio Company, Cedar Rapids, Iowa, a corporation of Iowa Filed Jan. 13, 1964, Ser. No. 337,427

16 Claims. (Cl. 325—30)

ABSTRACT OF THE DISCLOSURE

A universal data communication system with a computer controlled transmitter capable of generating quadrature spaced X and Y components of different combinations of magnitudes to produce time synchronous phasors upon which can be encoded data from one or more data channels in accordance with the error rate determined by error detecting means at the receiver. The computor at the transmitter is responsive to said error rate to alter the data transmission rate and thereby maintain said error rate within a predetermined range.

This invention relates generally to means for encoding and decoding data for transmission purposes and, more particularly, to means for encoding and decoding time synchronous data at transmission rates which can be increased or decreased in accordance with the existing signal-to-noise conditions.

There are in the prior art many systems for transmitting data. Some of these systems are known as time synchronous data transmission systems wherein each data bit occupies an interval of time equal to that of all other data bits and in which said equal intervals of time occur successively and continuously. Specific systems employing this general system of data transmission are identified by the trademark "Kineplex" and are described in detail in United States Patent 2,915,633, issued Dec. 1, 1959, to G. H. Barry and entitled, "Phase-Pulse Generator," and United States Patent 2,905,812, issued Sept. 22, 1959, to M. L. Doelz and entitled, "High Information Capacity Phase-Pulse Multiplex System," both of which are incorporated herein by reference.

As is discussed in detail in the foregoing cited patents, the data is transmitted on tones having a given frequency with the specific information carried on a given tone during a given time interval being determined by the phase of the tone during said time interval with respect to some reference phase which, in some of the systems described in the aforementioned applications, is the phase of the tone carrying the immediately preceding bit of information. For purposes of simplicity of expression, each of these tones occurring during one of the time intervals will be herein defined as a phasor. Thus, the information carried by any given phasor is identified by its phase with respect to the phase of the preceding phasor, or some other suitable reference, such as a constant phase signal generated by appropriate means. In the simplest system, wherein a single channel of information is being transmitted on a single tone, the information carried on each phasor will either be a single mark or a single space. Consequently, the ideal situation is to have the phases of the two phasors representing marks or spaces be 180° apart.

It is possible, however, to carry two or more channels on a single tone by having more than two phasors. For example, if two channels are carried on a single tone, the information carried on any given phasor can be correctly identified as carrying either a mark or a space of the first channel and either a mark or a space of the second channel. Since there are four possible combinations, in accordance with the expression $2^n$, where $n$ equals the number of channels, it is necessary to have four phasors to identify the information carried in each of the two channels. These four phasors ordinarily are spaced 90° apart. In the event that three channels of information are to be transmitted on a single tone, it is necessary to have eight phasors ($2^3$) in order to carry such information. For reasons that will be discussed in more detail hereinafter, actually sixteen phasor *positions* spaced equal angular distances apart are needed for transmitting three channels of information on a single tone, and eight phasor positions would be required to transmit two channels of information on a single tone.

Other tone frequencies may be used in addition to the first tone frequency mentioned above. Each of these additional tone frequencies can also carry a plurality of channels thereon. By a system known as orthogonal spacing which involves a certain frequency difference between the various tones and a certain time interval for each data bit, the various tones can be separated from each other at the receiver, and each tone decoded separately by suitable decoding means, which will be described in more detail later herein. The general background of orthogonal spacing can be found in the above-identified United States Patent 2,905,812.

One of the principal advantages of the system generally known as Kineplex system and described in the above-identified United States patents is that of speed of transmission. Such systems have a very high transmission rate capacity with a relatively low error rate. However, from time to time, due to various factors such as disturbances in the transmitting media, the signal-to-noise ratio will drop to a point where the error rate exceeds a tolerable level. Under such circumstances, it is desirable to lower the transmission rate so that the signal-to-noise ratio can be increased. It is a well-known fact, and in accordance with Shannon's theorem of conservation of bandwidth, that the signal-to-noise ratio can be increased by decreasing the transmission rate which, in effect, decreases the amount of information transmitted per unit of time. The systems described in the above-identified applications and patents, however, are not adapted to have their rate of data transmission changed.

On the other hand, there are occasions when the rate of data transmission can be increased due to an improved signal-to-noise ratio. It would mark a definite improvement in the art to provide a data transmission means responsive to changes in the error rate to either decrease or increase the rate of data transmission in accordance with the changes in the signal-to-noise ratio.

Accordingly, it is an object of the present invention to provide a data transmission system which will either decrease or increase the rate of data transmission in accordance with changes in the error rate of the transmitted data.

Another object of the invention is to provide a means for encoding and transmitting a time synchronous information signal in which the density of the information per unit of time may be increased or decreased depending upon the error rate occurring in the receiver of said transmitted signal and in response to a signal transmitted back to the transmitter from said receiver to indicate said error rate.

A further aim of the invention is to provide an encoding means capable of producing a time synchronous information signal capable of carrying a different number of channels on a given carrier tone depending upon the error rate occurring in said time synchronous information signal at a given receiver station.

In accordance with the invention, there is provided an encoding means located at the transmitting station and a decoding means located at the receiving station. At the transmitter there is required for each tone signal a single encoder or demodulator. Assume that the feasible maximum capacity of each tone signal is four channels, three of which are obtained by the phase relationship of the various phases and the fourth of which is obtained by a difference in amplitude of the phasors. The three channels which are carried by the phase relationship of the transmitted phasors will require that sixteen phasor positions be available in the tone signal. These sixteen phasor positions will be spaced at 22½ degree intervals.

In general, the aforementioned phasors are created in the encoder by adding together appropriate X and Y components to produce a resultant phasor of a desired phase angle with respect to the previous transmitted phasor. For example, assume that the X and Y co-ordinates are fixed and that it is desired to create a phasor of +45°. If we assume that the amplitude of a phasor is 1, then such a phasor may be constructed by adding together X and Y signal components having phases, respectively, of 0° and +90°, each with an amplitude of .707. Such component parts of the resultant phasor will, of course, lie along the X and Y axes. By inverting the phase of either the X or the Y component, or both components, the phasor can be positioned in any of the four quadrants.

The means by which such phasors are constructed comprise a pair of amplitude modulators connected in parallel to the signal tone source; one of said amplitude modulators being constructed to advance the phase of the received tone signal by 90° to form the Y component of the phasor. The other amplitude modulator produces the X component of the phasor.

The X and Y component outputs of the modulator are then supplied to individual phase modulators which function to either leave the phase of the component supplied thereto unchanged or to reverse it by 180°, thus determining the quadrant in which the phasor will be positioned. For example, if both phase modulators function to reverse the phases of the X and Y components of a phasor, which otherwise would be at a +45° position, such phasor would be repositioned at an angle of 225°.

Data processor means are provided to synchronize the various channels of information so that the data bits supplied from each channel are time synchronized with the data bits from all other channels. Said data processor means are further programmed to respond to the received data bits from the various channels of information to produce a series of binary output codes, one such binary output code being produced for each bit interval of the received channels and, further, one such binary output code being generated for each signal tone. (A separate modulator is required for each tone signal.) The binary output code is supplied to the amplitude modulators and to the phase modulators to produce a phasor having the proper phase relation with the immediately preceding phasor. The binary code signal functions not only to produce a new phasor in response to the data bits received during each data bit interval, but is also synchronized to produce said phasors in a time synchronous manner.

As noted above, if it is desired to transmit three channels by the angular position of the phasors alone, it is necessary that eight phasors be employed. However, since the position of any current phasor is always determined by reference to the phase of the preceding phasor and, further, since said preceding phasor is always caused to be midway between two phasor positions of the currently received data bit, it is necessary that sixteen phasor positions be available to transmit three channels by phasor position.

The foregoing discussion of the invention has related to the encoding of information on a phasor solely by relating the phases of successive phasors in a predetermined manner.

By changing the amplitude of phasors, it is possible to transmit a fourth channel on a single tone signal. More specifically, each phasor is caused to have either a full amplitude or a half amplitude to represent a mark or a space in a fourth channel. Thus, sixteen possible phasor positions can carry four channels of information.

The data processor is programmed to control the number of phasors and also the positions and amplitudes of the phasors, with the result that it is possible to change the number of channels being transmitted from four channels to three channels or to two channels, or if the signal-to-noise ratio is sufficiently bad, to a single channel.

A plurality of such modulators can be employed, each one functioning to encode a different tone signal; the said tone signals being orthogonally spaced from each other. By "orthogonally spaced" it is meant that the frequency difference between the various tones is equal to a frequency $f_d$ or multiples thereof with the lowest tone having a frequency equal to an integral multiple of $f_d$. As will be discussed later herein, by proper filtering means all tone signals, except a selected one, will be integrated out of the received composite signal, leaving only the selected tone, when the filtering drive time is made equal to the period of $f_d$.

At the receiver demodulating means are provided to decode the various tones back into the mark or space signals from which they were originally derived. One such demodulating means is required for each tone signal; each demodulating means being comprised of an X phase detector and a Y phase detector connected in parallel with respect to the incoming tone.

A reference signal having a frequency equal to the frequency of the tone which the specific demodulator is constructed to decode, is supplied directly to the X phase detector and through a 90° phase shift to the Y phase detector. For reasons that will become clearer later herein, it is not necessary that the phase of the reference signal have any particular relationship with the phase of the received tone signal. It is necessary only that the phase of the reference signal remain reasonably constant for any two adjacent tone signals. At this time, it will suffice to say that the reason that the phase of the reference signal need not have any particular relationship to the phase of the received tone signal is that the relationship of the phase of a given phasor is determined with respect to the phase of the reference signal and recorded in a computor. Subsequently, the phase of the next succeeding phasor is determined with respect to the phase of the reference signal and it also is recorded in the computor. Then, the phases of both the first and the second phasors are determined with respect to each other by their relationship with the phase of the common reference signal $f_1$. Thus, the phase of $f_1$ can have any relationship with the phase of the received signal as long as such phase relationship remains substantially constant over any two adjacent bits whose components are being compared.

A pair of integrating means, one for each of the X and the Y phase detectors is provided to translate the X component and the Y component of the decoded phasor into D-C components having amplitudes which are proportional to the amplitudes of the A-C X and Y components. Means are provided to sample said D-C voltages and to supply them to the aforesaid data processor which records said D-C voltages for any given phasor. The next phasor received is separated in a similar manner into X and Y components, which X and Y components are translated into D-C voltages representative of said X and Y components. Said D-C voltages are also supplied to the computor. The computor is programmed to compare the two sets of D-C voltages and from this comparison to determine the phase relationship of the second phasor with the first phasor. Once such phase relationship is determined, conventional means can be employed to extract the various channels of information contained in said phasor.

As indicated above, a plurality of demodulators are employed; one demodulator being required for each tone signal received in the composite received signal. The tone signals are spaced apart frequency-wise by a difference frequency $f_d$ or an integral multiple thereof. By permitting the received signal to drive the various demodulators for an interval of time equal to the period of the difference frequency $f_d$, all signals, except the particular tone signal having a frequency equal to the reference frequency of a particular demodulator will be removed from the output of said particular demodulator. The reasons for this are explained in detail in United States Patent 2,905,812, mentioned earlier herein. Such relationship between the drive time of the various demodulators for a given data bit and the period of the difference frequency of the various tones in the composite received signal is known as orthogonal spacing of the tone frequencies. Thus, each demodulator functions to select only one of the tones of the plurality of tones received.

Means are provided to sample sequentially the D-C voltages representing the X and Y components of the phasors at the termination of each drive time period of the various demodulators. Since the sampling means is common to all of the demodulators, it is necessary that the sampling be done sequentially.

Means are provided in the computor to determine the error rate of the received signal. Such means may be any one of several known in the art. A specific circuit for detecting errors is shown and described in co-pending application, Ser. No. 151,603, now Patent No. 3,173,125 filed Nov. 13, 1961, by Verl L. Taylor and entitled "Error Corrector Utilizing Character Average Value." If the error rate exceeds a certain value for a given received signal, a control signal is supplied back to the transmitter station to cause the encoding means to transmit a signal having a lower data density. For example, if three channels with sixteen phasor positions were found to have an excessive error rate, an error signal from the receiver would be supplied to the computor at the transmitter to select a group of eight phasor positions containing only two channels of information; the eight phasors, of course, being separated angularly by 45°.

On the other hand, if the error rate decreases below a certain predetermined value, a control signal is supplied back from the receiver station to the data processor at the transmitter station to cause the modulator to increase the transmission rate.

In addition to increasing the number of channels encoded on a single tone, the bit density can also be increased by increasing the bit rate. In order to increase the bit rate, however, it is necessary that the frequency of the tone signals and the difference frequency be changed. More specifically, if it is desired to double the bit rate the frequency of the tone signals must be doubled. Doubling the frequency of the tone signals will also double the difference frequency and thereby provide the necessary decrease in the time required for all tone signals, except the selected tone signal, to integrate themselves out at the receiving demodulator.

At the receiver the frequency of the reference signal also must be doubled in order to accommodate the doubled frequencies of the tone signals. Doubling of the tone signal frequencies at the transmitter and doubling of the reference signal frequencies at the receiver are performed under control of the data processors located at the transmitter and receivers, and occur as a result of a reduction in the error rate. In other words, if after encoding four channels of information on a tone signal, the error rate is still sufficiently low, it is possible with this invention to increase the bit rate, which increase may be a doubling of the bit rate or increasing the bit rate by some other suitable amount, such as 25% or 50%. The amount of increase in the bit rate is a matter of programming and is variable according to the needs of the programmer.

The above-mentioned and other objects and features of the invention will be more fully understood from the following description thereof when read in conjunction with the drawings, in which:

FIG. 4 is a chart showing the phasors created by the application of different instruction codes to the encoder of FIG. 1;

FIG. 6 is another vector diagram illustrating how the phase of a given phasor is compared with the phase of the preceding phasor with the aid of a reference signal to decode the received information on said given phasor;

FIG. 7 is a vector diagram relating to the circuit of FIG. 5 and showing in some detail the means of extracting the X and Y components of a given phasor;

Figure 8A:
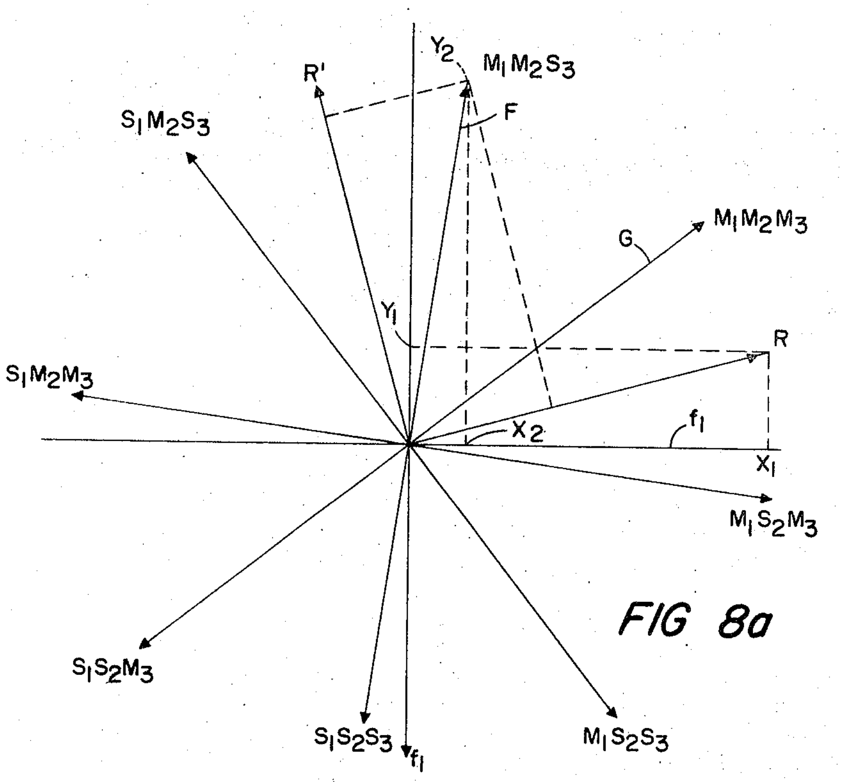
Figure 8B:
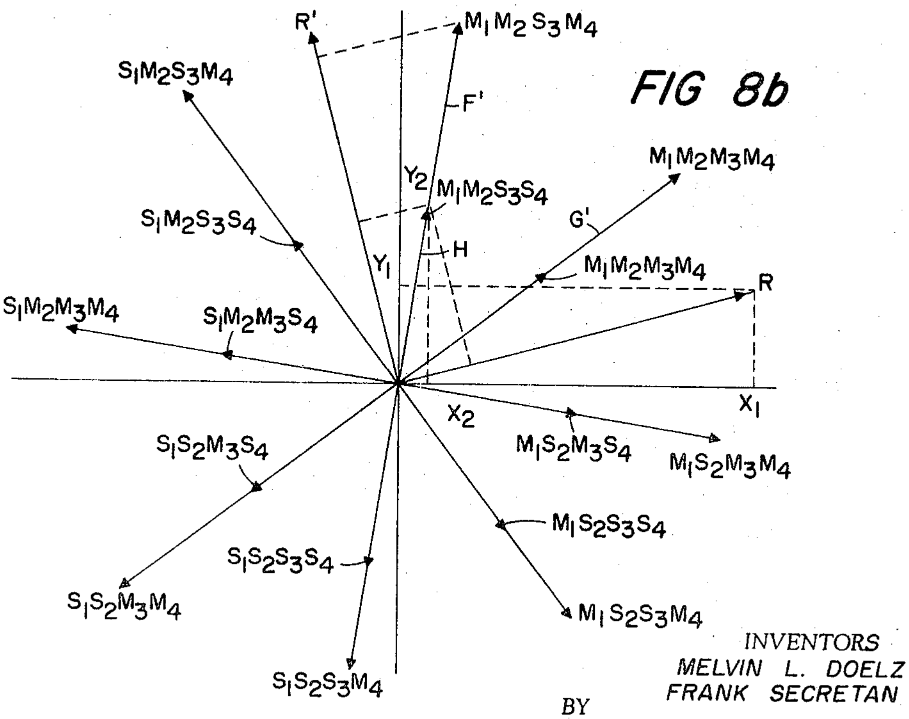
Figure 9:
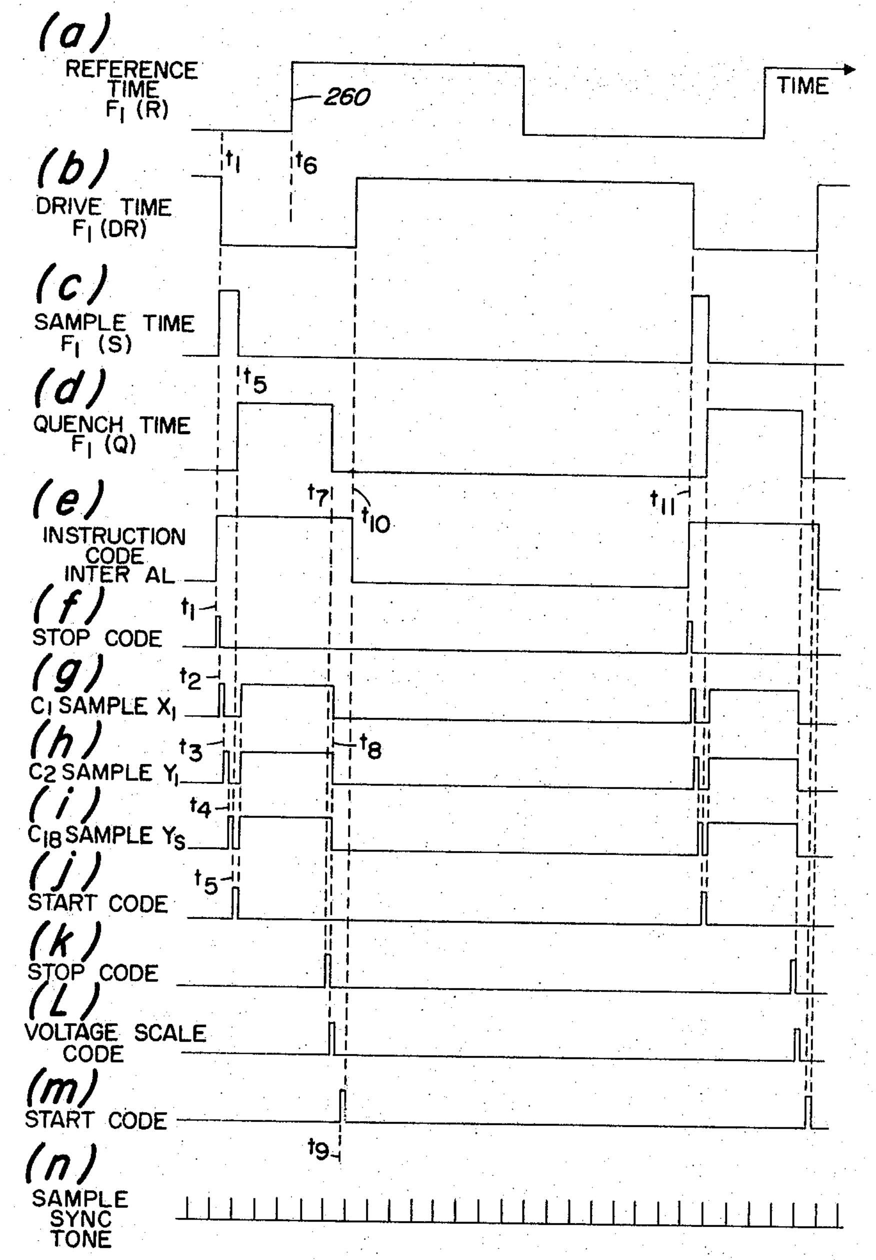
Figure 10:
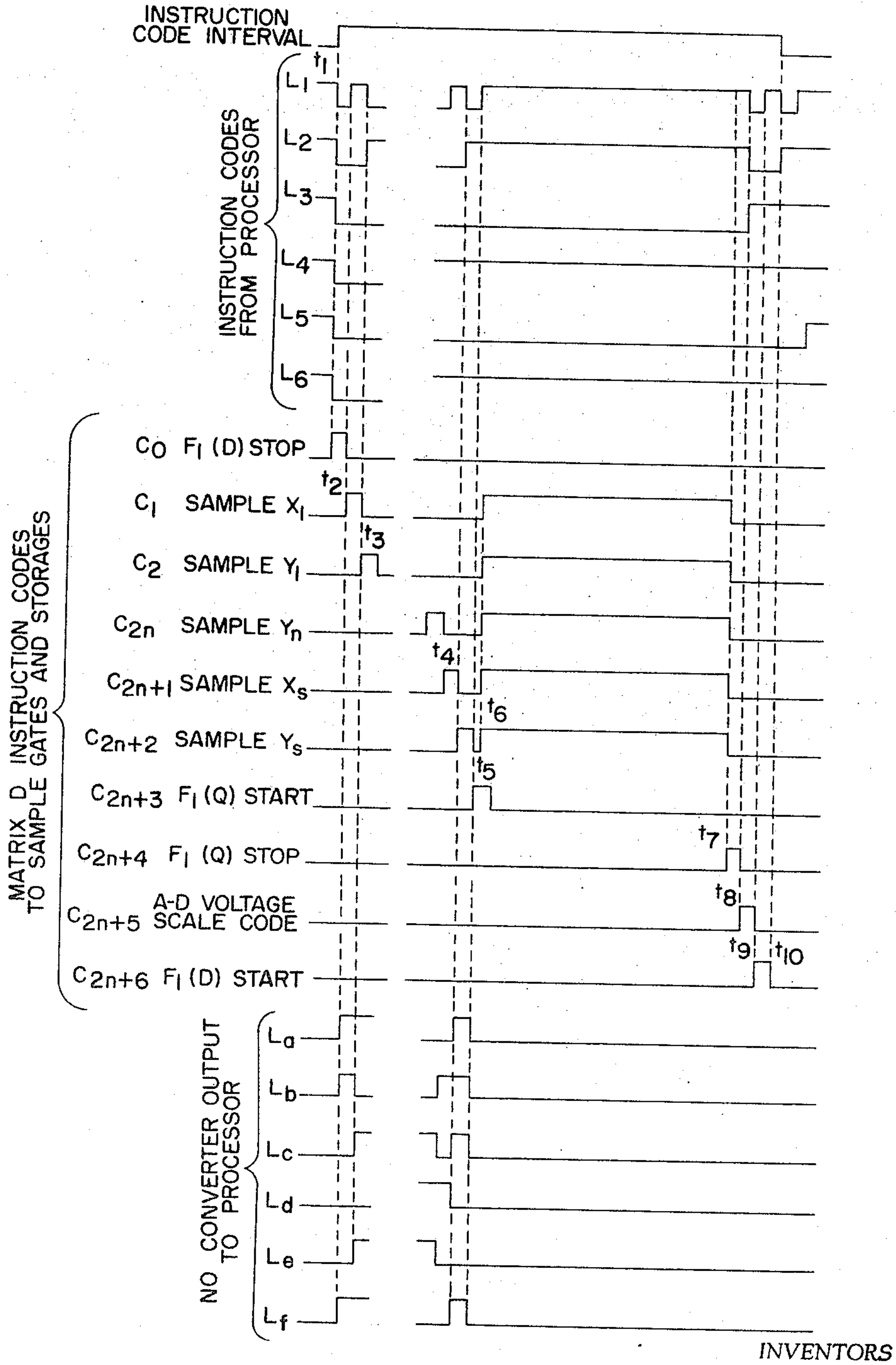
Figure 11:
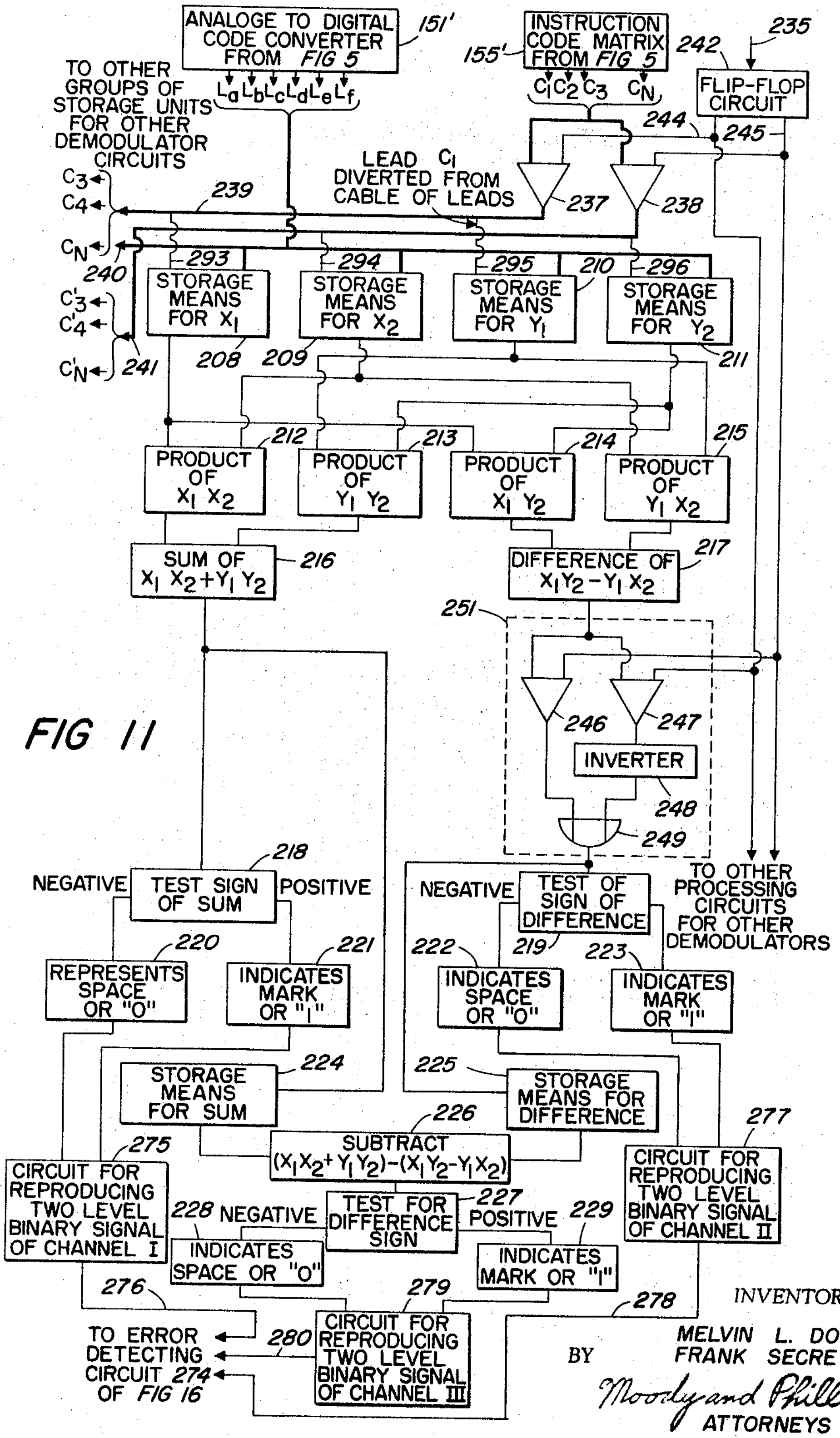
Figure 12:
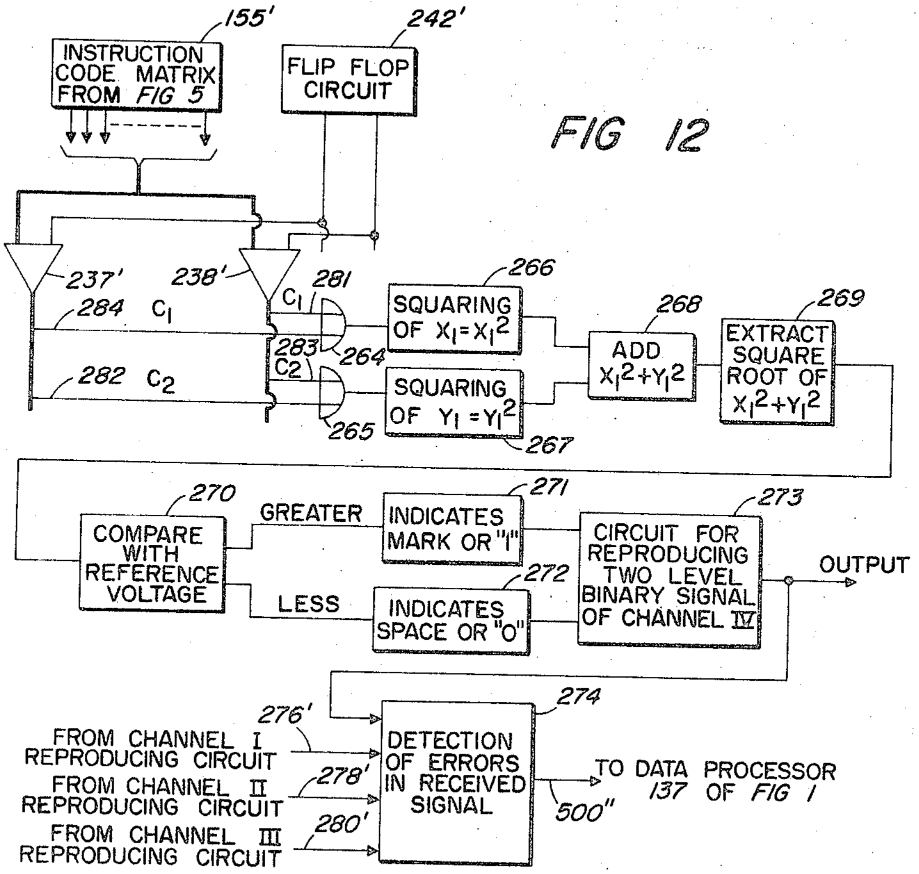
Figures 13, 14, 15, 16:
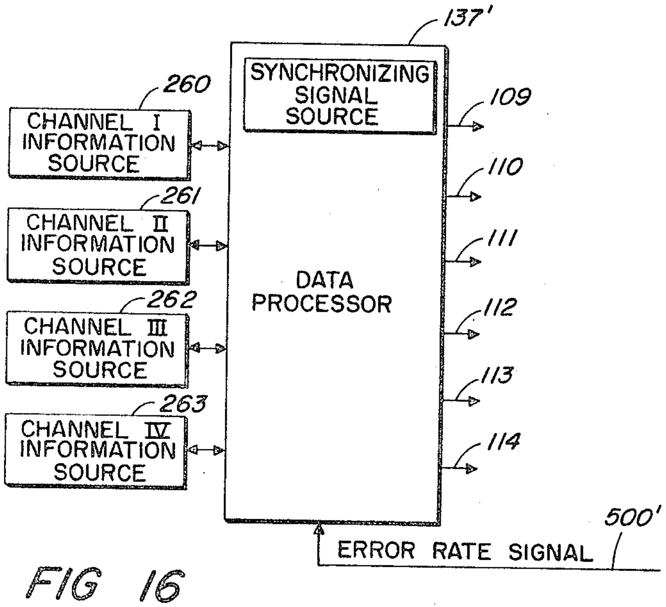
Figure 17:
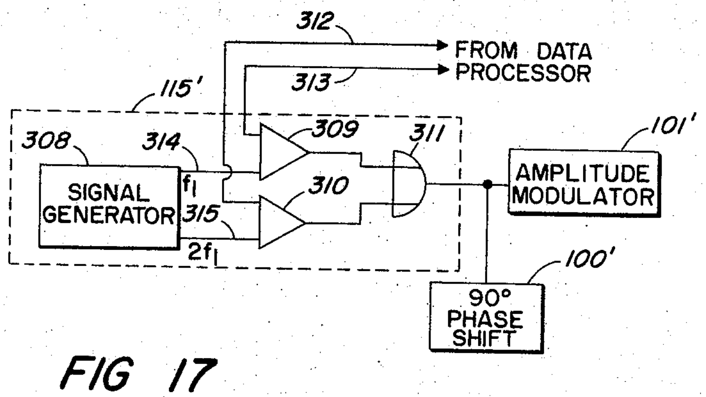
Figure 18:
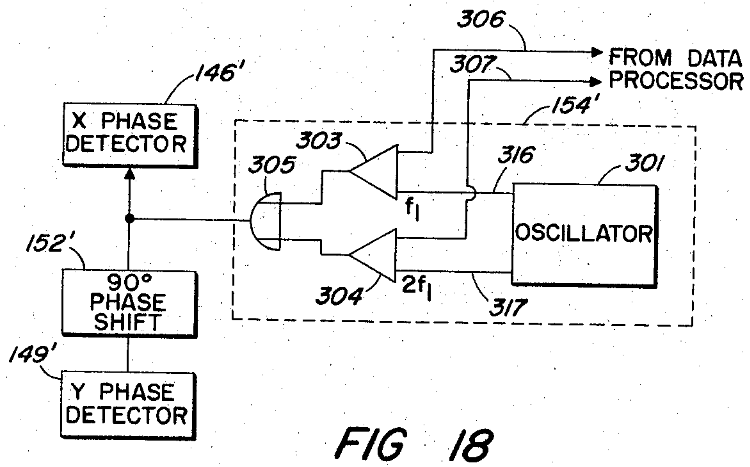

FIGS. 8*a* and 8*b* are also vector diagrams showing the positions of the eight phasors in a system employing three channels per tone;

FIG. 9 is a set of waveforms illustrating the operation of the demodulator portion of the system;

FIG. 10 is another set of waveforms showing an expanded version of a portion of the operation of the demodulator;

FIG. 11 is a processor-flow diagram showing the means by which the X and Y components of two adjacent phasors are employed to derive the specific information in each of the channels encoded upon a tone;

FIG. 12 is a block diagram showing a continuation of the flow diagram of FIG. 11;

FIG. 13 is a chart showing how the marks and spaces of the three channels of information will select different address locations of the data processor wherein are stored instructions for generating the phasor representative thereof;

FIGS. 14 and 15 are charts showing address locations containing instruction constants for generating phasors when only two or one channel is supplying information, and the signal codes for accessing said address locations;

FIG. 16 is a block diagram showing the channel information sources and the data processor located at the transmitter;

FIG. 17 is a block diagram of the circuit means for changing the frequency of the tone signals and thereby the bit rate of the generated phasors; and FIG. 18 is a block diagram of the circuit means for changing the frequency of the reference signals generated at the demodulators.

Figure 1:
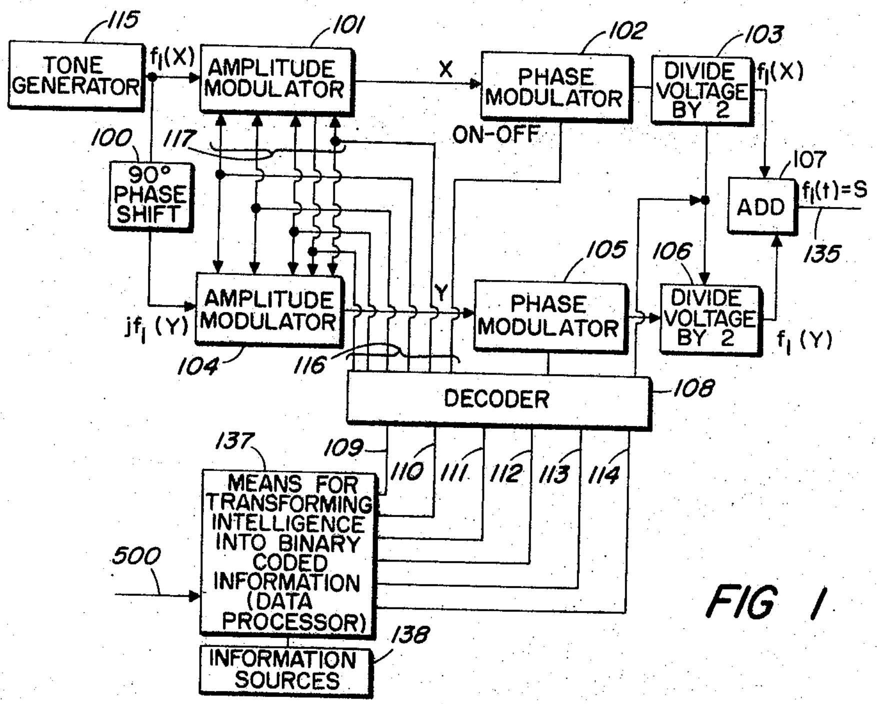
FIG. 1 shows a block diagram of the modulator or encoder located at the transmitter station.

Referring now to FIG. 1, tone generator 115 supplies a tone having a frequency $f_1$ to the amplitude modulator 101 and also to the amplitude modulator 104 through a 90° phase shift network 100. The output signals from the amplitude modulators 101 and 104 form the X and the Y components of the particular phasor being generated. Specifically, the amplitude modulator 101 forms the X component and the amplitude 104 forms the Y component of the phasor. A decoder 108 has input leads 109 to 114 connected thereto to which instruction codes are supplied from the data processor 137. The instruction codes are in the form of binary codes and perform three functions. Specifically, the three binary bits of each instruction code supplied to the input leads 109, 110, and 111 function, firstly, to separately determine the amplitudes of the X and the Y components generated by modulators 101 and 104. Secondly, since output signals from the modulators 101 and 104 are always positive, by definition, the phasors produced thereby will always lie in the first quadrant. To locate a given phasor in any of the other three qaudrants it is necessary to make either the X or the Y component, or both, negative. This is done by reversing the phase of either, or both, the X and the Y components. Phase modulators 102 and 105 function to produce such reversal of phase and are under control specifically of the bits of the instruction code supplied to the leads 112 and 113 of decoder 108.

As indicated hereinbefore, a fourth channel can be added to a single tone by varying the amplitude of the phasor between two amplitude levels, herein defined as full amplitude and half amplitude. Such change of amplitude is controlled by the voltage dividers 103 and 106 which respectively control the amplitude of the X and the Y components and which are controlled by the bit of the instruction code supplied to the lead 114 of decoder 108.

Figure 2:
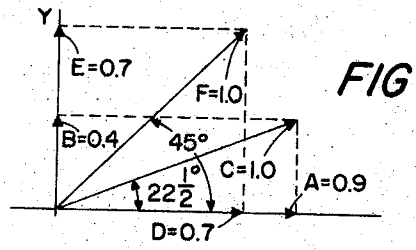
FIG. 2 is a vector diagram showing generally how the encoder employs X and Y components to form a phasor and how such phasor may be positioned in various quadrants.

Referring again to the three input leads 109, 110, and 111 of decoder 108, it is well known that three such leads can be employed to select any one of eight output leads. However, in the particular structure shown in FIG. 1 wherein three channels are encoded on a single tone by virtue of phase positioning alone, it is only necessary that the selection be made from among one of the five leads 116. Such five leads are connected individually to leads 117; each of the leads 117 being common to both modulators 101 and 104. Energization of any one of the leads 116 with subsequent energization of a corresponding one of leads 117 will produce a predetermined combination of amplitudes of the X and Y components at the output terminals of modulators 101 and 104. Specifically, referring to the chart of FIG. 4, it can be seen that when the binary code 100 is supplied to the input leads 109, 110, and 111 of decoder 108, the X component has an amplitude of 1.0 and the Y component has an amplitude of 0, to produce a resultant phasor having an amplitude of 1 and positioned at 0 degrees along the X axis. If a binary code 010 is supplied to the input leads 109 through 111 of decoder 108, there is produced by the X amplitude modulator 101 an X component (component A of FIG. 2) having an amplitude 0.9 and in the amplitude modulator 104, a Y component (component B in FIG. 2) having an amplitude of 0.4. These two components will produce a resultant phasor C in FIG. 2 of amplitude 1 and having a phase of $+22\frac{1}{2}°$ to the X axis. If a binary code of 110 is supplied to the input leads 109 through 111 of decoder 108, an X component D of amplitude 0.7 will be produced by modulator 101 and a Y component E of 0.7 will be produced by a modulator 104, thus producing a resultant phasor F of amplitude 1 and having a phase angle of $+45°$ with respect to the X axis. Similarly, if a binary code of 001 is supplied to the input leads 109 through 111 of decoder 108, the modulators 101 and 104 will produce X and Y components having amplitudes of 0.4 and 0.9, respectively, with the resultant phasor of 1.0 at an angle of $+67\frac{1}{2}°$ with respect to the X axis. In a like manner, if a binary code of 101 is supplied to the input leads 109 to 111 of decoder 108, the amplitude modulators 101 and 104 will produce X and Y components of amplitudes 0 and 1.0, respectively, to produce a resultant phasor of amplitude 1 lying along the positive Y axis.

Figure 3:
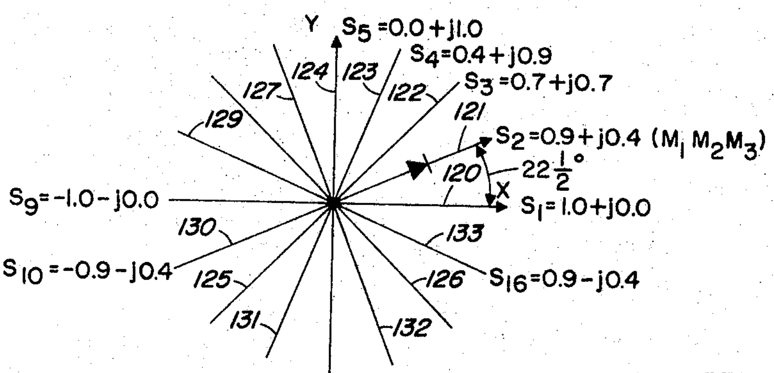
FIG. 3 is another vector diagram showing the 16 phasor positions required when three channels are encoded on a single tone.

The five phasors mentioned above, whose X and Y components are created by the amplitude modulators 101 and 104, are also represented by vectors 120 through 124 of FIG. 3.

It is to be noted that in a system wherein three channels are encoded upon a single tone, it is necessary to have eight phasors in order to identify the information carried in each of the three channels. As can be seen from FIG. 3, the particular phasors whose X and Y components are generated by the amplitude modulators 101 and 104, all lie in the first quadrant. Now, if phasors corresponding to phasors 121 and 123 are created in the other three quadrants and in corresponding positions, there will be produced a phasor system consisting of eight phasors, each spaced 45°. Said eight phasors are identified in FIG. 3 by reference characters 121, 123, 127, 129, 130, 131, 132, and 133 and are sufficient to carry the three channels of information on a single tone. However, it will be noted that the reference phasor 120 which is the phase of the preceding phasor in the case of any two adjacent data bits, is located in-between phasors 121 and 133. Thus, the angle between phasor 120 and phasor 121 is $22\frac{1}{2}°$. Now, since the phase of the preceding bit is always used as a reference in generating the signal and since the phase of the preceding bit is always positioned in-between two of the possible phasors of the following bit, such as phasors 121 and 133, it follows that sixteen phasor *positions* are necessary in order to carry three channels on a single tone. However, with respect to any given reference phasor, there are only eight possible phasor positions. For example, with respect to the reference phasor 120, the eight possible reference phasors are represented by the eight vectors 121, 123, 127, 129, 130, 131, 132, and 133.

In the chart of FIG. 4, there are shown the 16 possible phasor positions that can be created by the binary code supplied to the input leads 109 through 113 of decoder 108 of FIG. 1. It is to be noted that the input lead 114 is not considered in this chart of FIG. 4 since the lead 114 has to do with amplitude variation of the resultant phasors.

It will be noted that there are 16 horizontal rows in the chart of FIG. 4.

In the last column of FIG. 4, denoted as column R, there are shown the resultant rectangular co-ordinates produced by the various instruction codes applied to the decoder 108 of FIG. 1. Such resultant phasors appear on the output terminal 135 of the adder 107 of FIG. 1.

Since the system being described is a time-synchronous system, it is necessary that the binary coded instructions be supplied to the decoder 108 at regular periodic intervals in accordance with the desired time spacing of the data bits. The time spacing of the generated bits is, in fact, determined by the timing of the binary coded instructions. To obtain such time-synchronous encoding of the signal generated by the tone generator 115, there is provided a synchronizing signal generating means and a means for transforming intelligence from channel sources into binary coded information, both being represented generally by the block 137. The block 137, in the preferred embodiment of the invention, is a data processor and includes the synchronizing signal generating means.

Reference is made to the block diagram of FIG. 16 which shows the information source 138 of FIG. 1 as four information channel sources designated generally by blocks 260, 261, 262, and 263, and which feed into the data processor designated generally by block 137'. The data processor may be of the type shown in co-pending application, Ser. No. 304,407, now Patent No. 3,300,764, filed Aug. 26, 1963 by M. L. Doelz and G. F. Grondin, entitled "Data Processor" and incorporated herein by reference. It is to be understood that data processors, other than the one described in the copending application, Ser. No. 304,407, now Patent No. 3,300,764, can be employed in the present invention. Most general purpose data processors currently on the market can be programmed to perform the necessary functions on the information received from the four information channel sources 260, 261, 262, and 263.

The general function of the data processor 137' of FIG. 16 is to receive the information from the four channels 260 through 263, which information may be on paper tape, magnetic tape, Teletype equipment, or other sources. The data processor is programmed to accept from the output of each channel source a two-level binary encoded signal which is time synchronous with the two-level binary signal from the other channel sources. The data processor 137' is further programmed to sample the two-level binary signals derived from the outputs of channels 260–263 at least once during each bit period.

As discussed earlier, the number of channels encoded upon a transmitted phasor is dependent upon the error rate, and under certain circumstances can be as low as a single channel and under more favorable circumstances can be as high as four channels. It should be noted at this point that while it is possible to encode more than four channels on a single tone, the probability of error rises.

For purposes of discussion, assume the error rate to be such that only three channels 260, 261, and 262 are supplying information to the data processor 137 of FIG. 1. The data processor is programmed to sample the three received time synchronous two-level binary encoded signals once each bit period to produce a code referred to herein as the "signal code." From this three-bit signal code, the data processor computes the phase shift that the resultant phasor must have in order to encode the information contained in the three sampled bits. More specifically, the data processor will interpret the samplings from the three information sources to produce on the output leads 109 through 113 thereof a five-bit output code which is supplied to the decoder 108 of FIG. 1. The decoder 108 responds to said five-bit output code to select the proper X and Y components which are supplied to adder 107 to make up the desired phasor.

Since the phase of any given phasor is measured against the phase of the preceding phasor, a continuously occurring mark in all three channels results in an advancing phasor, with each advance being 22½ degrees (see the vector diagram of FIG. 3). As an example, assume that at a given time the phasor representing marks in all three channels is represented by an X component of 0.09 and a Y component of 0.4. If the next subsequent phasor represents marks in all three channels, it will have an X component of 0.7 and a Y component of 0.7, as indicated in FIG. 4.

The 16 possible phasor positions of FIG. 4 can be stored separately in 16 consecutive word locations in the memory bank of the data processor and have 16 consecutive address locations. Assume that these address locations are 1001 through 1016. By proper interpretation of the three-bit signal code from the information channel sources, the data processor determines what phase advance is necessary to produce a current phasor representative of the currently sampled three-bit signal code over the phase of the immediately previously generated phasor. The said immediately previously generated phasor will have been produced by selection of a five-bit code contained in a particular one of the 16 address locations of the processor memory bank. A register in the processor is programmed to keep a cumulative record of the address locations of the five-bit codes representing previous phasors. From said cumulative previous address locations the processor can compute the address location containing the five-bit code which will produce the proper phasor representative of the currently sampled three-bit signal. Worded in another way, the address locations of the five-bit output codes can be cumulatively stored in an appropriate register on a 16 count cycle basis. Thus, if the previous address location for a five-bit output code was address 1013 and the next received three-bit signal code calls for an address increase of five, then the new location will be 1013+5=1002 (on a 16 cycle count), which address location will contain the five-bit output code required to generate a phasor representing the currently received three-bit signal code.

In order for the data processor to determine the proper address increase needed for a given three-bit signal code from the channel sources, a second group of address locations in the data processor memory are required. With three channels of information there are eight possible combinations of marks and spaces, i.e., eight possible three-bit signal codes which can be sampled by the data processor. Consequently, eight address locations will be required. Assume, for discussion purposes, that these eight address locations are 2001 to 2008, inclusively. The eight possible combinations of marks and spaces are listed in FIG. 13 in accordance with the counter clockwise order in which they appear in the vector diagram of FIG. 8*a* with 1's representing marks and 0's representing spaces. Each of these three-bit signal codes is assigned a constant K which is shown in the right-hand column of FIG. 13. Such constant represents the increments of 22½ degrees that the new phasor must shift, in a counterclockwise direction, with respect to the previously generated phasor. Each constant is contained in one of the address locations 2001 to 2008, although not necessarily in consecutive order. Since the three-bit encoded signals do not follow an orderly binary arrangement, it would not be expedient to have the addresses of the word locations increase in order with the consecutive positions of the phasors. A better addressing method has the actual binary value of each of the three-bit encoded signals initiate access to the address locations corresponding thereto. Thus, the three-bit binary code 111, which represents a decimal 7, causes access to address location 2007 which contains the constant 1. Such constant 1 would then be read from address 2007 and supplied to the storage register containing the cumulative address locations of the other bank of address locations 1001–1016, as discussed above. The new total of address location is employed to access the new indicated address location containing the five-bit output code, which is then supplied to the encoder 108 of FIG. 1 to initiate generation of the proper phasor.

The foregoing discussion also applies to the case where four channels of information are being received by the processor, since the fourth channel does not affect the position of the phasor representing the first three channels, only the amplitude thereof. When four channels are being received the sampling from said fourth channel leaves the amplitude of the generated phasor unchanged when a mark is present therein but causes a change in the amplitude of the generated phasor when a space is contained therein.

As indicated earlier herein, under certain conditions where the error rate is high, only two and sometimes only one channel of information is encoded in a generated phasor. Under such circumstances, the chart of FIG. 13 is not applicable, and reference muts be made to the charts of FIGS. 14 and 15. The following paragraphs discuss the cases where only two channels, or only one channel, are encoded in the generated phasor.

When two channels or one channel are being transmitted, different sets of memory banks in the data processor must be employed. The chart of FIG. 14 shows the two bit signal codes and the constants employed when only two channels are operating. In such a case four word locations in the memory bank are set aside to store the constants corresponding to the four possible two-bit signal codes. It will be observed that these four constants are different from the constants of the chart of FIG. 13. Such difference is due to the fact that when only two channels are operating, the phase shifts for various phasors are different than in the case where three channels of information are encoded upon a single phasor. More specifically, the constants 2, 6, 10, and 14 represent phasor positions of 45°, 135°, 225°, and 315°, respectively, from the reference phasor, i.e., even multiples of 22½°, whereas the constants of FIG. 13 represent odd multiples of 22½°.

FIG. 15 is a chart containing the constants assigned to the samplings when only one channel of information is supplying data to the processor. The constants 4 and 12 represent phasor positions of 90° and 270° from the reference phasor.

The general expression for the number of possible phasor positions with respect to a given reference phase is $2^n$ where $n$ is the number of information channels encoded on said tone signal. However, since the possible phasor positions shift with each subsequent phasor by an angular amount equal to one-half the angular spacing between phasors, the total number of phasor positions the phasor generated must accommodate is $2^{n+1}$. The specific possible phasor positions P for any given combinations of marks and spaces from one or more information sources is defined by the following expression:

$$P=\frac{360}{2^{n+1}}(2R-1)$$

where R is any positive integer up to and including $2^n$.

The specific programming required to accomplish the foregoing sampling of information sources and the creation of the five-bit output signals, as shown in FIG. 4, is not set forth herein since such programming is well within the grasp of an experienced programmer and could be effected in several different ways, and on many different data processors.

The number of channels of information being supplied to the data processor is under the direct control of the processor. Thus, when the error rate of the signal received at the receiver changes by predetermined amount, a coded signal will be supplied from the receiver back to the data processor via lead 500 which instructs the data processor to either increase or decrease the number of channels from which it is receiving information. By virtue of suitable programming of the data processor, such change in the number of channels will be effected and one of the various memory blocks indicated in FIGS. 13, 14, or 15 will be accessed in accordance with the number of channels being utilized. Here, again, the specific program required to accomplish a change in the number of channels utilized in response to an error signal from the receiver, can be done readily in several different ways by an experienced programmer. Such programs will not be set forth herein since such programs are well within the state of the art and do not in themselves constitute a part of the invention.

Figure 5:
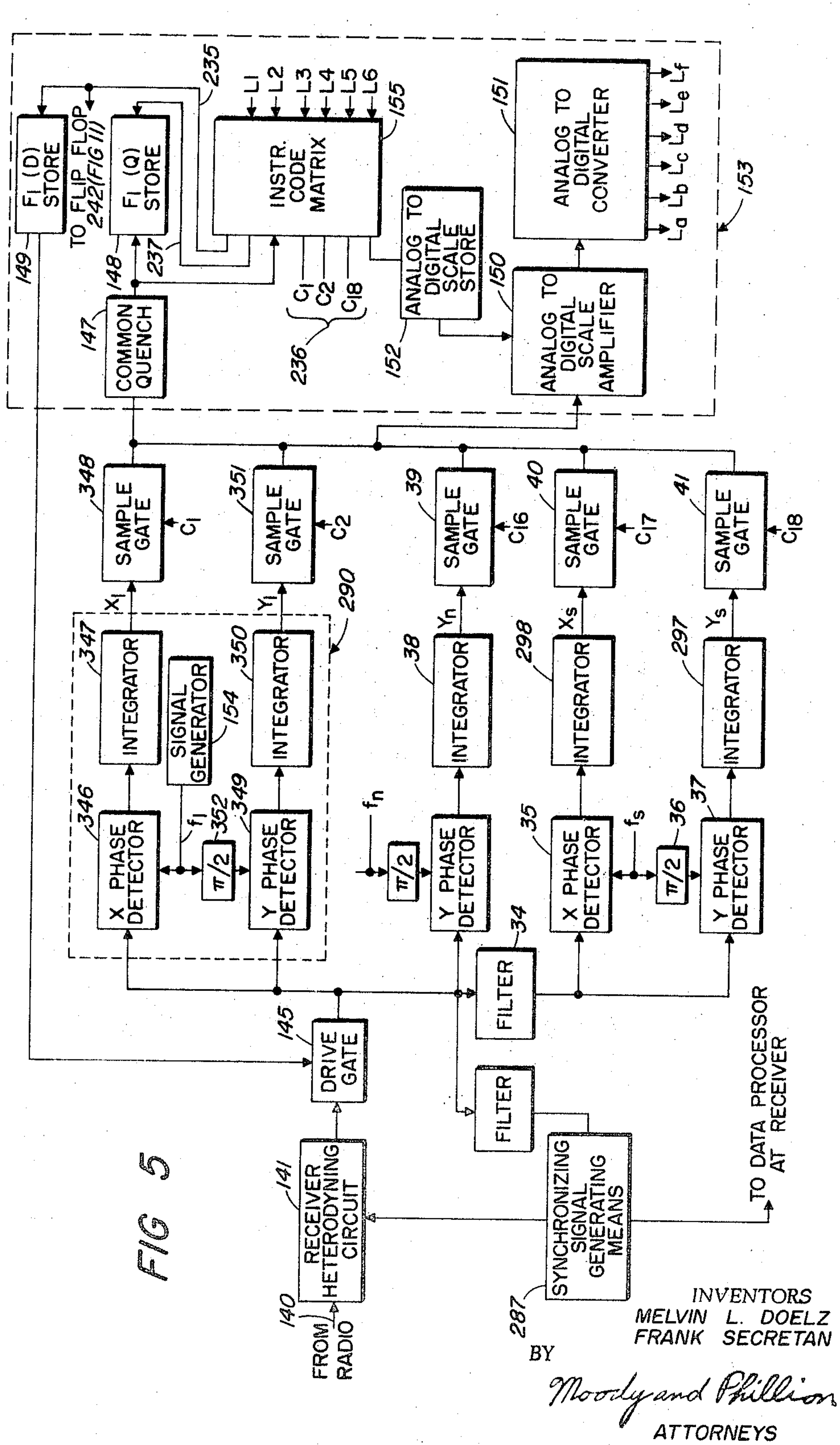
FIG. 5 is a block diagram of the decoder or demodulator located at the receiver station.

Referring now to the circuit of FIG. 5, there is shown a block diagram of the demodulator which is located at the receiver station. The transmitted signal tone is received on lead 140 and supplied to a receiver heterodyning circuit 141 where it is heterodyned to a frequency more suitable for detecting and integrating. Ordinarily, such heterodyning is to a frequency higher than that of the transmitted tone frequency. The heterodyned signal is supplied through gate 145 to a plurality of demodulators arranged in parallel. It should be noted that, usually, a plurality of tones are transmitted simultaneously, the tones being separated from one another by multiples of a difference frequency, $f_d$, as discussed hereinbefore. For each tone it is necessary to have a separate demodulator. In the circuit of FIG. 5 there are shown two such demodulators and a half section of a third demodulator. One of said demodulators is comprised of block 290, sampling gates 348 and 351, and a circuit common to all of the demodulators, said common circuit being comprised of the blocks within the dotted rectangle 153.

Synchronization at the demodulator can be accomplished by transmitting a separate synchronizing signal along with the intelligence bearing tone signals or by extracting the synchronizing signal from the received signal. Such extraction of the synchronizing signal (i.e., the bit rate synchronizing signal), can be accomplished as taught in United States Patent 2,914,674, issued Nov. 24, 1959, to George H. Barry.

The derived synchronizing signal is supplied to the data processor at the receiver which responds thereto to set a clock contained therein and thereby functions to regulate the generation of the timing signals required to demodulate the received signals. Such timing signals are shown in FIGS. 9 and 10, and will be discussed later herein.

Reference is now made to the detector system shown within the block 290. Such a detector system consists specifically of X phase detector 346, Y phase detector 349, 90° phase shift circuit means 352, reference signal generator means 154, which is constructed to produce a signal having a frequency equal to the frequency of the tone to be selected, and sampling gates 348 and 351. Assume that the frequency of the tone signal to be selected is $f_1$. Thus, the frequency of the signal generated by signal generated 154 would also be $f_1$. It is to be noted that it is not necessary that the phases of the two signals of frequency $f_1$ have any definite relationship. It is only necessary that the phase relationship of the two signals remain fairly constant over any two consecutively received phasors.

For an understanding of the operation of the phase detector 153, reference is made to the vector diagram of FIG. 6. Assume, specifically, that the phase of the reference signal $f_1$ is represented by vector $f_1$ of FIG. 6. Assume, further, that a phasor represented by vector A is received by the demodulator. The phase relationship between the phasor A and the vector $f_1$ is a purely arbitrary relationship. However, the phasor $f_1$ can be employed to establish a set of rectangular co-ordinates labeled the X and the Y axes in FIG. 6. On these X and Y co-ordinates the phasor A can be projected to produce X and Y components. Such X and Y components are labeled $X_1$ and $Y_1$ in FIG. 6. Assume now that the next subsequent occurring phasor B occurs. The phase relationship of the phasor B with respect to the previous phasor A will determine the information contained in the phasor B. It should be noted at this point that the information contained in phasor A is determined by its phase relationship with a previous phasor, not shown. From the following explanation which describes how the information in phasor B is derived from its relationship with phasor A, it will be understood how the information contained in the phasor A was derived from its relationship with the phasor prior thereto.

The $X_1$ and $Y_1$ components of the phasor A are integrated and changed into D-C voltages, which are then supplied to the data processor where they are stored. When phasor B is received by the receiver, it also is divided into X and Y components designated as the $X_2$ and $Y_2$ components in FIG. 6. Such $X_2$ and $Y_2$ components are changed by integration means into D-C voltages which are then supplied to the data processor. The two sets of X and Y components are compared in the processor to establish the phase relationship between phasors A and B. It will be observed that both sets of X and Y components are referenced with respect to a common set of co-ordinates established by the phase of the reference signal $f_1$.

The processing of the X and Y co-ordinates of each tone signal to decode the received phasors is accomplished within the processor by projecting the vector represented by components $X_1$ and $Y_1$ for one frame interval upon the vector represented by the $X_2$ and $Y_2$ co-ordinates for the following frame interval.

In the following paragraphs there will be set forth an analysis of demodulation obtained by comparing the X and Y components of consecutively received phasors.

In a two-vector, one-channel mode of operation, a mark will advance the transmitted phase by $\pi/2$ radians during the following bit interval and a space will retard the phase by $\pi/2$ radians during the following bit interval. Such relationship is shown in FIG. 7 where $S_1$ represents the phase of the last received signal (which will now become the reference signal) and $S_2$ or M represents the phase of the next succeeding, or presently received signal.

With $S_1$ and $S_2$ (or M) both available at the demodulator, the original data in the channel is detected as follows. If the reference signal is phase-shifted by a positive 90° and then product-multiplied with the presently received signal, $S_2$ or M, then the polarity of the resultant signal indicates the original data. By advancing the phase of the reference signal $S_1$, it is caused to coincide with the mark vector M of FIG. 7 and to be 180° out of phase with the space vector $S_2$ of FIG. 7. Thus, if the present phasor being received is a mark, the product multiplication of the advanced reference signal and the mark vector M will be positive, indicating that the received phasor is a mark. On the other hand, if the product multiplication of the advanced reference signal $S_1$ and the received phasor $S_2$ is negative, then such negative polarity indicates that the received vector is a space indicating vector and is 180° out of phase with the advanced reference signal $S_1$. It is to be understood that the advancing of the reference signal by 90° is only done in the case of a two-vector, one-channel modulation scheme. When more than one channel is employed, the advancing of the reference signal (i.e., the prior received bit) with a subsequent projection upon the following received phasor will be through a lesser angular amount.

The output of the X and the Y integrators, such as integrators 347 and 350 of FIG. 5 contain the D-C equivalents of the X and Y components of a given phasor, which components, as indicated above, are referenced to the phase of the signal generated by the generator 154.

For any particular frame interval the outputs from the X and Y integrators 347 and 350 are arbitrary, but during the next frame interval and the X and Y component outputs are either advanced or retarded by $\pi/2$ radians with respect to the first interval.

This means, if $$\theta_1=\tan^{-1}\left[\frac{Y_1}{X_1}\right] \quad (1)$$

and $$\theta_2=\tan^{-1}\left[\frac{Y_2}{X_2}\right] \quad (2)$$

then $$\theta_2=\theta_1\pm\frac{\pi}{2} \quad (3)$$

Where $\theta_1$ is the phase angle $S_1$ makes with the injected signal $f_1$ in FIG. 7 and $\theta_2$ is the angle that the new vector $S_2$ or $M_2$ makes with respect to the injected signal $f_1$.

The recovery of the information is then made within the stored logic section of the computer by processing the two samples $S_1=2X_1+jY_1$ and $M_2$ or $S_2=iX_2+jY_2$. The information "D" contained in the received signal is a mark if positive, and a space if negative, in the following experssion:

$$D=jS_1-S_2=Y_1X_2+X_1Y_2 \quad (4)$$

In a similar manner a four-vector, two-channel modulation scheme can be detected. Reference is made to the vector diagram of FIG. 6 wherein the vectors A and B are shown as being separated by an angle $\theta$ which, in a four-vector, two-channel modulation scheme would be equal to 45°. The other three vectors of the four vectors required in addition to vector B are vectors $S_1M_2$, $S_1S_2$, and $M_1S_2$. However, we are assuming that the particular vector phasor transmitted, of the four possible vectors, is phasor B.

The computer then functions to solve the following expression:

$$D_1=A\cdot B\text{ cosine }\theta=X_1X_2+Y_1Y_2 \quad (5)$$

Wherein $D_1$ designates the information in channel 1 of the two possible channels being employed.

If $D_1$ is greater than 0, i.e., is positive, then phasor B represents a mark in channel 1. On the other hand, if $D_1$ is negative, then phasor B represents a space in channel 1.

There are, however, two channels encoded on the tone. It can be shown that the information contained in the second channel is determined by the following relation:

$$D_2=A\cdot B\sin\theta=-Y_1X_2+X_1Y_2 \quad (6)$$

where $D_2$ represents the information contained in the second channel. If $D_2$ is greater than 0, then channel 2 contains a mark. If $D_2$ is less than 0, then channel 2, contains a space. It is to be noted that the expression $A\cdot B$ cosine $\theta$ represents the projection of vector B on vector A when vector A has been shifted by 90° to assume the position A', as shown in FIG. 6.

For the eight-vector, three-channel modulator scheme shown in FIG. 8*a*, the following criteria are employed for detection:

$$D_1=X_1X_2+Y_1Y_2 \begin{matrix} D_1>0\text{ mark} \\ D_2<0\text{ space}\end{matrix} \quad (7)$$

$$D_2=-Y_1X_2+X_1Y_2 \begin{matrix} D_2>0\text{ mark} \\ D_2<0\text{ space}\end{matrix} \quad (8)$$

$$D_3 \begin{matrix} \nearrow\text{Mark when } |D_1|>|C_2| \\ \searrow\text{Space when } |D_1|<|C_2|\end{matrix} \quad (9)$$

In the vector diagram of FIG. 8*a*, the eight phasor vectors are drawn with respect to the rectangular co-ordinate system established by the injection signal $f_1$.

Also, in FIG. 8*a* there is shown the projection of a received phasor vector F upon the reference phasor R and also upon the reference signal R', which is merely R shifted by 90°. It is to be noted that the reference signal R represents the immediately previously received phasor. In addition, FIG. 8*a* shows the projections of the presently received phasor F and the reference phasor R upon the X and the Y axes of the rectangular co-ordinate system.

The expressions 7, 8, and 9 are to be read upon the vector diagram of FIG. 8*a*. It will be observed that both vector F and vector G contain the same information in the first two channels, which information is shown as being marks. However, the information contained in the third channel, as represented by vector F, is a space and as represented by vector G, is a mark. From expression (9) it can be seen that if the projection of vector F upon vector R is less than the projection of vector F upon vector R', then the information contained in the third channel is a space. An examination of the vector diagram of FIG. 8*a* will vertify this relationship.

Similarly, if the phasor represented by vector G had been received instead of vector F, then if the projection of vector G upon the reference vector R were greater than the projection of G upon R', as is the case in FIG. 8*a*, then the information contained in channel 3 by phasor G would be a mark, as defined by experssion 9. An examination of FIG. 8*a* again bears out the aforementioned relationship. It is to be noted that although the phase of $f_1$ is not critical, except insofar as it must remain fairly constant for any two consecutively received phasors, nevertheless, the phase of $f_1$ can be made to nearly coincide with one of the sixteen phasor positions employed in a system in which three channels of information are encoded. Such positioning or phasing of the reference timing singal $f_1$ is accomplished by adjusting its positive edges to agree with the observed phase transitions on the signal tone.

As discussed in connection with FIG. 1, there is supplied in the modulator means a pair of multipliers 103 and 106, which function to divide the amplitude of any particular phasor, and by this means encode a fourth channel on the single tone. In FIG. 8*b* there is shown a vector diagram in which a fourth channel has been encoded. It will be noted that the vector diagram of FIG. 8*b* is very similar to that of FIG. 8*a*, except that each of the full amplitude vectors has coincident therewith a half amplitude vector. For example, the vector of phasor F' in FIG. 8*b* has a half amplitude vector H coincident therewith in phase. Similarly, each of the other seven vectors has a half vector coincident therewith. The half amplitude vectors, such as half amplitude vector H, has encoded thereon the same information in the first three channels as the corresponding full-length vector F'. However, the information contained in the fourth channel is determined by the length of the vector. More specifically, the half-length vector in any of the eight phasors represents a space and a full-length vector represents a mark in the fourth channel as indicated in the vector diagram of FIG. 8*b*.

The data contained in the first three channels is decoded in the same manner as is employed in the case of a full-length vector, i.e., the expressions 7, 8, and 9 set forth above, are employed. However, in the case of a half-length vector, the X and Y projections will necessarily be one-half the amplitude as in the case of the full-length vector.

The fourth channel is derived directly from the amplitude of the vector; said amplitude being determined by an application of the Pythagorean Theorem. More specifically, the X and Y components of the vector H or vector F' are squared and then the square root of the sum of squares of the X and Y components is taken to supply the absolute amplitude of the phasor. Such computation is done by standard arithmetical circuits contained in the computer, and in a manner to be described later herein.

*Discussion of processing circuitry within the computer*

Up to this point the discussion of the demodulator has been concerned, primarily, with the structure of FIG. 5 and a general discussion of the theory by which the encoded 1, 2, 3, or 4 channels of information on a single tone can be decoded. In FIG. 11 there is shown a block diagram of a flow chart showing the manner in which the information sampled from the integrators, such as integrators 347 and 350 of FIG. 5 is handled. The analog-to-digital converter 151' corresponds to the converter 151 of FIG. 5. The output signal of the analog-to-digital converter 151', appearing on leads $L_a$, $L_b$, $L_c$, $L_d$, $L_e$, and $L_f$, is a binary code which indicates the amplitude of the sampled X or Y component. The input to said analog-to-digital converter is supplied from the outputs of integrators, such as integrators 347, 350, 38, 298, and 297, under control of the timing pulse appearing on leads $C_1$, $C_2$, $C_3$, . . . $C_n$, which timing pulses have two functions. Firstly, as stated above, such pulses are employed to sequentially gate the outputs of said integrators by means of gating circuits, such as gating circuits 348, 351, 39 40, and 41 of FIG. 5. Secondly, such pulses are employed to distribute the aforementioned samplings into the proper storage means, such as storage means 208 through 211 of FIG. 11, through AND gates 237 and 238.

The storage means for each demodulator consists of four individual storage means, such as the storage means 208, 209, 210, 211, which contain the X and Y components of the presently received signal and the immediately preceding data bit which is received by the demodulator 153. More specifically, as can be seen in FIG. 11, the storage means 208 and 210, respectively, are shown as containing the X and Y components of the preceding data bit, and the storage means 209 and 211 are shown as containing the X and Y components of the data bit presently being received. It is important to note, however, that when the next data bit is received, the data bit stored in the storage means 209 and 211 will become the prior or reference X and Y components, and the X and Y components of the newly received data bit will be stored in the storage means 208 and 210. Thus, the two storage means 208 and 210 and the two storage means 209 and 211 are used to alternately store reference data bit components and presently received data bit components.

With respect to the processing of the X components, the fact that the storage means 208 and 209 are used alternately to store presently received X components and reference X compoents, is not important since the *sum* of the cross products of the X components and the Y components is to be obtained in the block 216.

In the case of storage means 210 and 211, however, the alternate use of said two storage means to store present Y components and reference Y components becomes important since the *difference* of the cross products of the components is obtained in block 217. The following example will illustrate the foregoing point. As shown in block 217 of FIG. 11, it is required that $Y_1X_2$ be subtracted from $X_1Y_2$ where the sub 1 components comprise the reference components. However, when the next subsequent data bit is received, the sub 2 components in block 217 will become the reference components and the sub 1 components will now be the presently received data bit; it being understood that the sub 1 components now represent an entirely different data bit. Thus, it will be necessary to subtract the contents of block 214 from the contents of block 215 in order to obtain the desired difference.

It is appropriate at this time to point out how the storage means 208 through 211 are alternately used to store reference X and Y components and presently received X and Y components. Such alternate use is obtained by means of the AND gates 237 and 238, and the flip-flop circuit 242 which is energized by the drive pulse appearing on output lead 235 of instruction code matrix 155 of FIG. 5. More specificaly, each time a new data bit is received the flip-flop 242 changes state so that the signal appearing on one or the other of output leads 244 and 245 will alternately enable AND gates 237 and 238. From FIG. 11 it can be seen that two of the output leads of gate 238 connect to the input leads 294 and 296 of storage means 209 and 211, and that two of the output leads of gate 237 connect to input leads 293 and 295 of storage means 208 and 210. In a particular situation shown in FIG. 11, a signal has been supplied through the gate 237 to energize the storage means 208 and 210 whereby the X and Y components have been stored therein. When the next or presently received data signal is received by the demodulator 153 of FIG. 5, the flip-flop circuit 242 will be caused to change state so as to enable the gate 238 in FIG. 11 and disable the gate 237. Thus, at the end of the drive time, when sampling of the outputs of integrators 347 and 350 (FIG. 5) occur, the said samplings will be stored in storage means 209 and 211 under control of the output of gate 238. Under such circumstances, the structure of block 217 will function to subtract $Y_1X_2$ from $X_1Y_2$ with the proper sign.

When a third data bit is received the flip-flop circuit 242 will again change states to energize the gate 237 and deenergize the gate 238, thus causing the X and Y sampling from said third data bit to be stored in the storage means 208 and 210. Thus, the storage means 208 and 210 now hold the X and Y components of the presently received signal and the storage means 209 and 211 contain the reference signal. In order to compensate for the change in sign which would occur in the operation of block 217 under these conditions, the output of said block 217 is inverted. Such inversion is accomplished by circuitry within the block 251 of FIG. 11. More specifically, the gate 247 is caused to be energized whenever gate 237 is enabled by means of the flip-flop circuit 242. Thus, when the third data bit is stored in storage means 208 and 210, the gate 247 is enabled and the gate 246 is disabled. Consequently, the output of block 217 has its sign inverted by inverter 248 to produce the corrected difference voltage.

When the reference signal is stored in the storage means 208 and 210, the gates 238 and 246 of FIG. 11 are enabled so that the difference voltage produced by block 217 is passed directly through gate 246 and OR gate 249 to the polarity testing circuit 219.

With the foregoing discussion in mind, a straightforward discussion of the operation of the flow chart of FIG. 11 can now be given. The information stored in the various storage circuits 208 and 211, is cross multiplied to produce the various products shown in the blocks 212 to 215, inclusively. It will be noted that the products shown in blocks 212 to 215 comprise the terms of the expression 4 through 9 set forth hereinbefore, and are employed to solve said expressions. For example, blocks 212 and 213, respectively, contain the products of $X_1X_2$ and $Y_1Y_2$. The sum of these two products is used in determining the solution to expressions 5 and 7 set forth above and thus determine the information contained in channel I of either a four-vector, two-channel system, or an eight-vector, three-channel modulation scheme. The circuit for finding the sum of blocks 212 and 213 is represented by block 216. Similarly, the block 217 functions to find the difference between the products produced in blocks 214 and 215, thus providing means for finding the solution to expressions 6 and 8 set forth hereinbefore, which represents the information contained in the second channel. Blocks 218 and 219, respectively, determine the sign of the sum of the terms processed by block 216 and the sign of the difference between the terms processed by block 217. Such polarities indicate whether the channel contains a mark or a space. For example, if the sign of the sum of block 216 is negative, channel I contains a space and is so indicated by the output signal of block 220. If the sign is positive, then channel I contains a mark which is indicated by the output of the block 221. See expression 5 above.

In a similar manner, the blocks 222 and 223 determine and indicate whether the difference between the terms set forth in block 217 are negative or positive and thus represent either a space or a mark, respectively. Blocks 224 and 225 function to store the absolute sum appearing in block 216 and in the block 217, respectively. The difference in the absolute sum stored in block 224 and the absolute difference stored in block 225 indicates whether a mark or a space is stored in channel III, as discussed hereinbefore. Such intelligence is determined by the polarity of the voltage produced by the block 226. If negative, channel III contains a space and, if positive, channel III contains a mark.

The blocks 220, 221, 222, 223, 228 and 229 which indicate marks or spaces in channels I, II, and III also have their outputs connected to the circuits represented by blocks 275, 277, and 279, respectively. The blocks 275, 277, and 279 function to reproduce the original two level binary signals of channels I, II, and III as originally produced at the transmitter. The outputs of the blocks 275, 277, and 279 are supplied to suitable utilization means and are also supplied to an error-detecting circuit 274 shown in FIG. 12, which error-detecting circuit functions to detect errors in the outputs of the reproduced information channels I, II, and III.

Also shown in FIG. 12 is the flow diagram for reproducing the two-level binary signal of channel IV. The X and Y samplings of a particular phasor are taken from the proper conductors of the output cables of AND gates 237′ and 238′. As discussed earlier herein such samplings appear alternately at the outputs of the AND gates 237′ and 238′ since said AND gates are alternately energized. Thus, the two leads 284 and 281 both represent the X component, but during alternate time intervals. Similarly, the leads 282 and 283 both represent the Y component, but during alternate time intervals. Both the X and Y components are squared as indicated by blocks 266 and 267, and the sum of the squared quantities determined in block 268. The square root of the sum of the squares of the X and Y components ($\sqrt{X^2+Y^2}$) is then extracted and compared with a reference voltage, as indicated in blocks 269 and 270. If such square root is greater than the reference voltage, a mark is indicated in channel IV. If the extracted square root is less than the reference voltage, a space is indicated in channel IV. The output of the space and mark indicating means 271 and 272 are supplied to a circuit means for reproducing the two-level binary signals of channel IV, which two-level binary signal is supplied not only to a suitable utilization means, but also to the error-detecting means 274.

The error-detection means 274 detects errors in all four channels, or any lesser number of channels in operation. More specifically, in the case where four channels of data are being transmitted, the error-detection means will detect errors in all four channels. If only channels I, II, and III are transmitting information, then the error-detection means will detect errors only in channels I, II, and III.

The output of error-detection means 274 is supplied back to the processor at the transmitter in the form of a properly coded signal which the processor is capable of understanding. The particular code supplied from the error-detecting means to the data processor at the transmitter will vary in accordance with the error rate of the received signals. Depending upon the error rate, either 1, 2, 3, or 4 channels will transmit. The output of the error-detection block 274 will indicate to the processor the precise number of information channels which should be transmitting.

*Timing waveforms*

The discussion will now be turned to an examination of the timing waveforms shown in FIG. 9 and FIG. 10. It is apparent that certain timing signals must be generated in order to synchronize the various functions performed by the demodulator, such as providing a start signal, driving the demodulators, sampling the outputs of the integrators, providing a start signal for quenching, and quenching the demodulators.

A synchronizing tone, as shown in FIG. 9*n*, is included in the received composite data spectrum to allow the modem configuration of this invention to be compatible with other existing modems. Such synchronizing tone is supplied into the processor of the receiver often enough to identify the phase transition with the desired accuracy. It is necessary to determine when phase transition between received bits occurs in order to produce the necessary bit synchronizing signal in the receiver. It is from such bit synchronizing signal that the various synchronized waveforms of FIGS. 9 and 10 are derived.

Thus, from the phase transitions of the received signal there is produced a reference signal represented by the curve 9*a*; said reference signal being synchronized with the bit rate of the received signal and having its positive-going edge, such as occurs at time $t_6$, substantially centered with the observed phase transitions of the received signal, i.e., centered in time interval $t_1$–$t_{10}$, for example. It will be noted that the positive-going edge 260 of waveform **9*a* bears no particular phase relationship with the synchronizing tone of waveform 9*n*. What happens is that the synchronizing tone of waveform 9*n* is compared with the received data bearing signal having the same frequency and is employed to mark the time that phase transition occurs in the data bearing signal. By appropriate and well-known means, not specifically shown in this specification, the reference signal of waveform 9*a* is caused to be delayed by a sufficient amount so that its positive edge 260** will coincide substantially with the midpoint of the aforementioned phase transitions of the data bearing signal.

From the reference signal source of FIG. 9*a* there is derived the signal shown in waveforms **9*b* through 9*m***, inclusively. Generally speaking, the derivation of the waveforms of FIGS. 9*b* through 9*m* is carried out in the computer in the form of binary characters which are then supplied to the input leads $L_1$–$L_6$ of instruction code matrix 155 (FIG. 5). The instruction code matrix decodes the received binary codes from the computer and generates the waveforms shown in FIG. 9 which include, in addition to other waveforms, the drive waveform (FIG. 9*b*) appearing on the output lead 235 of FIG. 5, the sampling pulses (FIGS. 9*g*, 9*h*, and 9*i*) appearing on the group of output leads labeled, generally, by the reference character 236 of FIG. 5, and the quenching pulse (FIG. 9*d*) appearing on output lead 237 (FIG. 5). It is to be noted that the sampling pulse carrying leads 236 comprise a plurality of leads which are connected individually to all the sampling gates such as gates 348, 351, 39, 40, and 41 of FIG. 5. As indicated hereinbefore, the circuit of FIG. 5 is incomplete in that it actually only shows two and one-half demodulators.

The several demodulators of FIG. 5 are connected in parallel with each other with each demodulator having two sample gates and with each sample gate requiring a separate output pulse from the instruction code matrix 155. Thus, in FIG. 5 the specific output lead $C_1$ of instruction code matrix 155 is connected to the input lead $C_1$ of sample gate 348, lead $C_2$ is connected to the input lead $C_2$ of sample gate 351, and the output lead $C_{18}$ is connected to the input lead $C_{18}$ of sample gate 41.

The waveforms of FIGS. *9f* and *9m* show the signals for stopping and starting the drive time; which signals appear on the output lead 235 of the instruction code matrix 155. The lead 235 actually consists of at least two leads since it drives the circuit of block 149 which is a flip-flop type circuit. The circuit 149 is responsive to said stop and start control signals to produce the drive signal of FIG. 9*b*, which is supplied to drive gate 145 of FIG. 5. At time $t_1$ in FIG. 9, the driving signal is cut off and remains cut off until time $t_{10}$, when driving is again initiated for a new received data bit. However, at time $t_1$ when the drive signal is terminated for a given data bit, there is an interval of time between $t_1$ and $t_{10}$ during which information must be extracted from the various demodulators and the demodulators quenched and prepared for the next incoming data bit. When the drive signal is terminated, as at time $t_1$, sampling begins and continues through the sampling time shown in FIG. 9*c* which includes the time interval $t_1$–$t_5$. Some sampling signals are shown in waveforms 9*g* through 9*i*, it being understood that while only three sampling signals are actually shown, there is in the actual system, a plurality of demodulators, each requiring two sampling pulses for each received bit.

The sampling of the various sample gates 348, 351, 39, 40, and 41 (FIG. 5) occurs consecutively; a separate sampling time interval being alloted to each sampling gate.

When the last sample gate 41 has been sampled, the computer functions to generate a quench start code as shown in waveform 9*j* and beginning at time $t_5$. Such quench start code appears on the output lead 237 (FIG. 5) of the instruction code matrix 155 and is supplied to the quench pulse generating circuit 148. Said quench pulse generating circuit 148 functions to produce the quench timing pulse of FIG. 9*d*, which pulse begins at time $t_5$ and terminates at time $t_7$. Termination of the quench pulse is controlled by the quench stop code in waveform 9*k*, also generated by the instruction code matrix 155 in response to a binary code from the computer supplied to the input leads $L_1$–$L_6$. The quench stop code is also supplied to bistable quench control circuit 148 through connection 237 which consists of two leads.

During the time interval $t_5$–$t_7$ all of the sample gates, such as gates 348, 351, 39, 40, and 41 are opened to permit the quenching signal to pass back through the sample gates and quench the signals in the demodulator, such as demodulator 290.

Immediately after the quench stop code of FIG. 9*k* there is produced an analog-to-digital (A–D) voltage scale code pulse, as shown at time $t_8$ in FIG. 9L. Said voltage scale code is employed to change the scale of the analog-to-digital conversion of amplifier 150 in order to utilize the maximum range of the analog-to-digital converter 151 (FIG. 5). Specifically, R-C integrators in the converter 151 are provided to be approximately linear for the longest bit or frame interval. Linearity is, of course, thereby assured for any shorter time intervals. However, the maximum output of an integrator is directly proportional to the length of the time interval. Thus, if the bit interval is reduced by two to increase the data transmission rate, for example, the integrators' output signal amplitude will become halved so that amplification of the amplifier can then be doubled to return the output thereof to a constant maximum voltage presented to the A–D converter 151. The full range of the converter is then always employed.

At time $t_{10}$ the instruction code interval, as shown in waveform 9*e*, is terminated by the start code of waveform 9*m*, which functions to initiate the drive signal at time $t_{10}$ and, as shown in the waveform of FIG. 9*b*, will drive continuously until time $t_{11}$, which completes the cycle which began at time $t_1$.

Referring now to FIG. 10, there is shown an expanded view of the waveforms 9*e* through 9*m*, inclusively, during a time interval corresponding to the instruction time interval $t_0$ through $t_{10}$.

Also in FIG. 10 are shown the inputs supplied to the input leads $L_1$–$L_6$ of the instruction code matrix 155 of FIG. 5. It will be observed that the binary instruction codes supplied to the input leads $L_1$–$L_6$ have been selected to consist of a simple sequence number system. For example, the first instruction code supplied to leads $L_1$–$L_6$ at time $t_1$ consists of the binary number zero. The next instruction code, beginning at time $t_2$, consists of a binary one source to the lead $L_1$ and zero supplied to leads $L_2$–$L_6$, inclusively, which represents the decimal numeral 1. The next succeeding code begins at time $t_3$, and represents a decimal numeral 2. In the specific example shown in FIG. 10, at time $t_{10}$, forty-six such instruction codes are required with the 46th instruction code being the binary code representting the decimal numeral 46.

All of the X and Y component samplings taken from the integrator outputs of FIG. 5 appear sequentially on the output leads $L_a$–$L_f$ of the A–D converter 151 of FIG. 5 in digital form, and are supplied to the computer. The computer receives the digitalized samplings and processes them in the manner described hereinbefore to extract the intelligence contained therein.

As has been discussed hereinbefore, it is possible by means of proper programming of the data processors and in co-operation with the circuit means shown in FIGS. 17 and 18 to change the bit rate of the transmitted phasors. More specifically, in FIGS. 17 and 18 there are shown means for doubling the bit rate.

In FIG. 17, which shows a circuit means for doubling the bit rate of the phasors generated at the generator, the signal generator 308, the AND gates 309 and 310, and the OR gate 311, collectively, correspond to the tone generator 115 of FIG. 1. However, the structure of FIG. 17 is capable of producing a tone signal of frequency $f_1$ on output lead 314 of signal generator 308, or a tone signal of frequency $2f_1$ on output lead 315 of signal generator 308. The tone signals $f_1$ and $2f_1$ are supplied to the inputs of gating circuits 309 and 310, respectively. However, only one of the AND gates 309 or 310 is opened at any given time to permit passage of a tone signal. By means of leads 312 and 313, which are connected to the data processor located at the transmitter, either the AND gate 309 or the AND gate 310 is opened in response to the error rate of the received signal. The output signals of both AND gates 309 and 310 are supplied through OR gate 311 to amplitude modulator 101' and the 90° phase shift circuit 100'.

If the error rate is sufficiently low, AND gate 310 will be opened to permit passage of the higher tone signal having the higher frequency $2f_1$. As the error rate increases a threshold will be passed whereby the data processor will be instructed to cause gate 310 to be closed and gate 309 to be opened to permit passage of the tone signal of frequency $f_1$ into the phasor generating circuit.

The reference signal frequency at the demodulators must be the same as the frequency of the tone signals (phasors) in order to receive and demodulate the generated phasors. To accomplish such change of the reference signal frequency, there is provided the circuit means within the block 154' of FIG. 18 which corresponds to the block 154 of FIG. 5. It is to be understood that each of the demodulating circuits will have a similar arrangement.

The oscillator 301 is constructed to generate a reference signal having a frequency $f_1$ and a second reference signal having a frequency $2f_1$ appearing on outputs 316 and 317, respectively, which are connected to inputs of AND gates 303 and 304, respectively. The said AND gates 303 and 304 are under control of an output signal from the data processor via leads 306 and 307, such that only one of the AND gates 303 and 304 will permit passage of a tone signal to the OR gate 305 and thence to the demodulating circuit. The data processor at the receiver is programmed to open either gate 303 or gate 304 to correspond to the condition of AND gates 309 and 310 located at the transmitter and shown in FIG. 17. Thus, when the frequency of the generated phasors changes from $f_1$ to $2f_1$, the frequency of the reference signal will also change from $f_1$ to $2f_1$.

It is to be noted that the form of the invention shown and described herein is but a preferred embodiment thereof and that various changes may be made in the circuit logic without departing from the spirit or the scope thereof.

We claim:

1. In a communication system employing tone signals divided into time synchronous segments with each segment constituting a phasor whose phase with respect to the phase of the preceding phasor is representative of the information encoded therein, and comprising:

receiver means for receiving said phasors and including an error rate detecting means constructed to produce coded signals indicative of the error rate of the received signal;

transmitter means for generating and transmitting said phasors, said transmitter means comprising:

signal tone generator means for producing an original tone signal of frequency $f_1$;

X and Y signal component generating means constructed to respond to time synchronous binary coded signals supplied thereto to produce X and Y quadrature phased signal components of predetermined combinations of magnitudes and polarities from the output signal of said signal tone generator;

means for combining said X and Y signal components to produce a phasor of frequency $f_1$ but phased with respect to said original tone signal in accordance with the relative magnitudes of said X and Y signal components;

a plurality of information channels each constructed to produce an output signal consisting of data bits;

encoding means including first data processor means for receiving the data from said plurality of information channels and being programmed to respond to the various permutations and combinations of received data bits to produce at the output of said data processor means a continuing output of said time synchronous binary coded signals, one binary coded signal for each data bit interval and determinative of the relative magnitudes of the X and Y components to be generated by said X and Y signal component generating means;

said X and Y signal component generating means responsive to said time synchronous binary coded signals to produce phasors, each having a phase with respect to the phase of the immediately preceding phasor which phase is representative of all data bits supplied from all the information channels supplying data to said data processor during a given data bit time interval, said data processor means further being programmed to respond to the error rate signal from said error rate detecting means to increase or decrease the number of information channels supplying information thereto until said error rate lies within predetermined limits.

2. A communication system in accordance with claim 1 in which said X and Y signal component generating means comprises:

first amplitude modulator means and phase modulator means responsive to the output of said data processor means to produce the X component of the phasor being generated;

second amplitude modulator means and phase modulator means responsive to the output of said data processor means to produce the Y component of the phasor being generated;

said Y component being in phase quadrature with said X component;

output means including means for adding together said X and Y components to form a phasor;

said first amplitude modulator means and phase modulator means and said second amplitude modulator means and phase modulator means being constructed to generate X and Y components which always combine to form phasors of equal amplitude.

3. A communication system in accordance with claim 2 in which said X and Y signal component generating means further comprises voltage attenuating means constructed to respond to particular output codes of said data processor to attenuate said X and Y components by proportionate amounts.

4. A communication system in accordance with claim 1 comprising:

decoder means responsive to the output signals of said data processor to produce a second set of binary code signals which contain the information defining the X and Y components to be generated by said X and Y signal component generating means;

and in which said X and Y signal component generating means comprises:

first amplitude modulator means and phase modulator means responsive to the output of said decoder means to produce the X component of the phasor being generated;

second amplitude modulator means and phase modulator means responsive to the output of said decoder means to produce the Y component of the phasor being generated;

said Y component being in phase quadrature with said X component;

output means including means for adding together said X and Y components to form a phasor;

said first amplitude modulator means and phase modulator means and said second amplitude modulator means and phase modulator means being constructed to generate X and Y components which always combine to form phasors having equal amplitude.

5. A communication system in accordance with claim 4 in which said X and Y signal component generating means further comprises voltage attenuating means constructed to respond to particular output codes of said decoder means to attenuate said X and Y components by proportionate amounts.

6. A communication system in accordance with claim 1 in which said X and Y signal component generating means is constructed to respond to the binary coded output signals of said first data processor means to produce $2^N$ possible phasors during any given bit period, wherein N is the number of channels of information encoded by means of the phasor position, with each of said $2^N$ possible phasors having an angular position P with respect to the phase of the immediately preceding phasor in accordance with the following expression:

$$P=\frac{360}{2^{N+1}}(2R-1)$$

where R is any positive integer up to and including $2^N$.

7. A communication system in accordance with claim 6 in which said X and Y signal component generating means comprises:

first amplitude modulator means and phase modulator means responsive to the output of said data processor means to produce the X component of the phasor being generated;

second amplitude modulator means and phase modulator means responsive to the output of said data processor means to produce the Y component of the phasor being generated;

said Y component being in phase quadrature with said X component, output means including means for adding together said X and Y components to form a phasor;

said first amplitude modulator means and phase modulator means and said second amplitude modulator means and phase modulator means being constructed to generate X and Y components which always combine to form phasors of equal amplitude.

8. A communication system in accordance with claim 7 in which said X and Y signal component generating means further comprises voltage attenuating means constructed to respond to particular output codes of said data processor to attenuate said X and Y components by proportionate amounts.

9. A communication system in accordance with claim 6 comprising:

decoder means responsive to the output signals of said data processor to produce a second set of binary code signals which contain the information defining the X and Y components to be generated by said X and Y signal component generating means;

and in which said X and Y signal component generating means comprises:

first amplitude modulator means and phase modulator means responsive to the output of said decoder means to produce the X component of the phasor being generated;

second amplitude modulator means and phase modulator means responsive to the output of said decoder means to produce the Y component of the phasor being generated;

said Y component being in phase quadrature with said X component;

output means including means for adding together said X and Y components to form a phasor;

said first amplitude modulator means and phase modulator means and said second amplitude modulator means and phase modulator means being constructed to generate X and Y components which always combine to form phasors of equal amplitude.

10. A communication system in accordance with claim 9 in which said X and Y signal component generating means further comprises voltage attenuating means constructed to respond to particular output codes of said decoder means to attenuate said X and Y components by proportionate amounts.

11. A communication system in accordance with claim 6 in which said receiver means comprises:

detecting means comprising:

an X component phase detector and a Y component phase detector;

signal source means constructed to supply reference signals of frequency $f_1$ in phase quadrature to said X and Y component phase detectors;

said X and Y component phase detectors constructed to respond to the received phasors and to the said reference signals to produce X and Y D-C signal component outputs whose magnitudes are representative of the magnitudes of the X and Y components of the received phasors;

and means for sampling the X and Y D-C components representative of each phasor;

and second data processor means constructed to receive and store said X and Y D-C samplings of each currently received phasor with the X and Y D-C samplings of the immediately preceding phasor to determine the identity of the binary bit of each channel of information contained in the currently received phasor by comparison of the magnitude of the X and Y D-C components of the currently received phasor with the X and Y D-C components of the immediately preceding phasor.

12. A communication system in accordance with claim 11 comprising:

a plurality of detecting means each constructed to receive a separate tone signal with each tone signal carrying a variable number of information channels and being spaced apart by a difference frequency $f_d$;

in which the lowest tone signal frequency is an integral multiple of $f_d$;

in which each of said detecting means comprises separate integrating means for integrating the output signals of the X and Y component phase detectors contained therein;

and in which the sampling means of each detecting means is constructed to sample the output signals of the integrating means of the same detecting means to produce said X and Y D-C samplings;

and means for gating the received phasors into each of said detecting means at time intervals $1/f_d$.

13. A communication system in accordance with claim 12 comprising:

means for quenching the data signals accumulated in said detecting means at the end of each data bit period;

timing signal generating means constructed to respond to coded instruction signals from said second data processor means to generate the said gating signals, the said sampling signals, and the said quenching signals;

and in which said second data processor means is programmed to generate said coded instruction signals to be supplied to said timing signal generating means.

14. A communication system in accordance with claim 6 in which said receiver means comprises:

detecting means comprising:

an X component phase detector and a Y component phase detector;

signal source means constructed to supply reference signals of frequency $f_1$ in phase quadrature to said X and Y component phase detectors;

said X and Y component phase detectors constructed to respond to the received phasors and to the said reference signals to produce X and Y D-C signal component outputs whose magnitudes are representative of the magnitudes of the X and Y components of the received phasors, and means for sampling the X and Y D-C components representative of each phasor, and second data processor means constructed to receive and store said X and Y D-C samplings and to compare the X and Y D-C samplings of each currently received phasor with the X and Y D-C samplings of the immediately preceding phasor to determine the identity of the binary bit of each channel of information contained in the currently received phasor by comparison of the magnitudes of the products of the X and Y D-C components of the currently received phasor and the X and Y D-C components of the immediately preceding phasor in accordance with the following mathematical expressions:

$$C_1 = X_1X_2 + Y_1Y_2 \gtreqless 0$$
$$C_2 = -Y_1X_2 + X_1Y_2 \gtreqless 0$$
$$C_3 = C_2 - C_1 \gtreqless 0$$

where $C_1$, $C_2$, and $C_3$ represent the binary bits and the first, second, and third information channels, $X_1$ and $Y_1$ represent the D-C components of the immediately previously received phasor, and $X_2$ and $Y_2$ represent the D-C components of the currently received phasor;

and where the identities of $C_1$ and $C_2$ are determined by whether they are greater or less than zero and the identity of $C_3$ is determined by whether the difference between $C_1$ and $C_2$ is greater or less than zero.

15. A communication system in accordance with claim 14 comprising:

a plurality of detecting means each constructed to rereceive a separate tone signal, each tone signal carrying a variable number of information channels and being spaced apart by a difference frequency $f_d$;

in which the lowest tone signal frequency is an integral multiple of $f_d$;

in which each of said detecting means comprises separate integrating means for integrating the output signals of the X and Y component phase detectors contained therein;

and in which the sampling means of each detecting means is constructed to sample the output signals of the integrating means of the same detecting means to produce said X and Y D-C samplings, and means for gating the received phasors into each of said detecting means at time interval $1/f_d$.

16. A communication system in accordance with claim 15 comprising:

means for quenching the data signals accumulated in each of said detecting means at the end of each data bit period;

timing signal generating means constructed to respond to coded instruction signals from said second data processor means to generate the said gating signals, the said sampling signals, and the said quenching signals;

and in which said second data processor means is programmed to generate said coded instruction signals to be supplied to said timing signal generating means.

References Cited

UNITED STATES PATENTS

| | | | |
|---|---|---|---|
| 2,984,701 | 5/1961 | Barry | 178—66 |
| 3,123,670 | 3/1964 | Kaenel | 178—66 |
| 3,135,919 | 6/1964 | Heald | 325—346 X |
| 3,242,262 | 3/1966 | Melas | 325—30 X |

JOHN W. CALDWELL, *Acting Primary Examiner.*

DAVID G. REDINBAUGH, *Examiner.*

W. S. FROMMER, *Assistant Examiner.*